(12) United States Patent  
Kano et al.

(10) Patent No.: US 8,359,431 B2
(45) Date of Patent: Jan. 22, 2013

(54) STORAGE SUBSYSTEM AND ITS DATA PROCESSING METHOD FOR REDUCING THE AMOUNT OF DATA TO BE STORED IN A SEMICONDUCTOR NONVOLATILE MEMORY

(75) Inventors: Yoshiki Kano, Yokohama (JP);
Masanori Takada, Yokohama (JP);
Akira Yamamoto, Sagamihara (JP);
Akihiko Araki, Yokohama (JP);
Masayuki Yamamoto, Sagamihara (JP);
Jun Kitahara, Yokohama (JP);
Sadahiro Sugimoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 12/665,220

(22) PCT Filed: Aug. 20, 2009

(86) PCT No.: PCT/JP2009/003959
§ 371 (c)(1),
(2), (4) Date: Dec. 17, 2009

(87) PCT Pub. No.: WO2011/021237
PCT Pub. Date: Feb. 24, 2011

(65) Prior Publication Data
US 2011/0191520 A1      Aug. 4, 2011

(51) Int. Cl.
*G06F 13/00*      (2006.01)
(52) U.S. Cl. .................. 711/114; 711/103; 711/E12.008
(58) Field of Classification Search .......................... None
See application file for complete search history.

(56) References Cited

U.S. PATENT DOCUMENTS

2006/0212651 A1*   9/2006   Ashmore ...................... 711/113
2008/0109615 A1*   5/2008   Morishita et al. ............. 711/154
2009/0150605 A1*   6/2009   Flynn et al. ................... 711/112
(Continued)

FOREIGN PATENT DOCUMENTS

EP           1764677 A1      3/2007
(Continued)

OTHER PUBLICATIONS

International Search Report and Written Opinion for PCT International Application No. PCT/JP2009/003959, mailed Mar. 29, 2010.
(Continued)

*Primary Examiner* — Edward Dudek, Jr.
*Assistant Examiner* — Sean D Rossiter
(74) *Attorney, Agent, or Firm* — Brundidge & Stanger, P.C.

(57) ABSTRACT

The amount of data to be stored in a semiconductor nonvolatile memory can be reduced and overhead associated with data processing can be reduced. When a microprocessor 112 receives a write request from a host computer 300 and data D1 to D3 exist in a cache slot 117, the microprocessor 112 reads the LBA of each piece of the data, manages each piece of the data D1 to D3 using a bitmap table 118 by associating them with their LBAs, generates a specific command CMD based on the LBAs of the data D1 to D3, adds the data D1 to D3 and addresses ADD1 to ADD3 indicating where the data D1 to D3 are to be stored, to the specific command CMD, and sends it to an FMPK 30. The FMPK 130 stores each piece of update data in a specified block in the flash memory 135 based on the specific command CMD.

8 Claims, 24 Drawing Sheets

U.S. PATENT DOCUMENTS

2009/0204872 A1    8/2009  Yu
2009/0265510 A1*  10/2009  Walther et al. ................ 711/114
2011/0087827 A1*   4/2011  Yeh .............................. 711/103

FOREIGN PATENT DOCUMENTS

EP          1862905  A2   12/2007

OTHER PUBLICATIONS

"Building Storage Networks—Develop Large Capacity, High Availability Network Storage Solution" (ISBN0-07-212050-9), pp. 207-208 by Marc Farley.

* cited by examiner

FIG.4

| RG NUMBER | PDEV NUMBER | RAID |
|---|---|---|
| 1 | 1, 2, 3, 4 | RAID5 |
| ... | ... | ... |
| ... | ... | ... |

FIG.5

| LDEV NUMBER | RAID GROUP NUMBER | STRIPE LINE START NUMBER | STRIPE LINE END NUMBER |
|---|---|---|---|
| 0 | 0 | 0 | 281250000 |
| 1 | ... | ... | ... |
| ... | ... | ... | ... |

FIG.6

| CACHE SLOT NUMBER | MEMORY ADDRESS | BITMAP TABLE ADDRESS |
|---|---|---|
| 1 | 0x0001000 | 0x1100000 |
| ... | ... | ... |
| ... | ... | ... |

| PDEV NUMBER | SLOT NUMBER | DEVICE TYPE |
|---|---|---|
| 1 | 1 | FMPK |
| ... | ... | ... |
| 200 | 200 | SSD |
| ... | ... | ... |
| 300 | 300 | HDD |
| ... | ... | ... |

FIG.8

| LBA | FM NUMBER | BLK NUMBER | PAGE NUMBER | START BYTE ON THE PAGE |
|---|---|---|---|---|
| 0 | 0 | 0 | 0 | 0 |
| 1 | 0 | 0 | 0 | 512 |
| ... | ... | ... | ... | ... |
| ... | ... | ... | ... | ... |

801 802 803 804 805

151

STORAGE SUBSYSTEM AND ITS DATA PROCESSING METHOD FOR REDUCING THE AMOUNT OF DATA TO BE STORED IN A SEMICONDUCTOR NONVOLATILE MEMORY

TECHNICAL FIELD

The present invention generally relates to a data processing technique for a storage subsystem using nonvolatile semiconductor memories as storage media.

BACKGROUND ART

HDDs (Hard Disk Drives) and flash memories are used as storage media for a storage subsystem. When destaging processing is executed for writing data in a cache memory to storage media in order to process the relevant data in accordance with an I/O command from a host computer in the above-described type of storage subsystem, pieces of update data may exist at separate locations in cache slots in the cache memory.

If an HDD is used as a storage medium in the above-described situation, the pieces of the update data existing in the cache slots and the sparced data existing between the pieces of the update data are put together to form a continuous data group, which is then written to the HDD (see Non-patent Document 1). In this case, it is only necessary to issue an I/O command once without issuing the I/O command for each piece of the update data and, therefore, it is possible to reduce processing time required for seek and rotational delay.

On the other hand, if a flash memory is used as a storage medium, a method of extracting only the pieces of the update data existing in cache slots in the cache memory, writing the extracted pieces of the update data separately to the flash memory, and thereby reducing the data amount used per writing is adopted.

CITATION LIST

Non Patent Literature

NPL 1
Building Storage Networks—Develop Large Capacity, High Availability Network Storage Solution (ISBN 0-07-212050-9), pages 207-208

SUMMARY OF INVENTION

Technical Problem

When a flash memory is used as a storage medium and update data in the cache memory is written to the flash memory, if a method of gathering the pieces of the update data existing in cache slots and other pieces of data (sparced data) existing between the pieces of the update data to form a continuous data group, and writing it to the flash memory at once is adopted, the amount of data will increase and the number of erases pertaining to blocks in the flash memory will increase.

On the other hand, if the method of writing the pieces of the update data existing in the cache slots separately to the flash memory is adopted, it is possible to reduce the number of erases pertaining to the blocks in the flash memory, but the number of I/O commands will increase and the overhead for processing the data will increase.

The present invention was devised in light of the problems of the above-described conventional techniques. It is an object of the invention to provide a storage subsystem and its data processing method capable of reducing the amount of data to be stored in the semiconductor nonvolatile memory and also reduce the overhead associated with processing of the data.

Solution to Problem

In order to achieve the above-described object, the present invention is characterized in that when executing destaging processing for writing a plurality of pieces of update data existing in a cache memory to a nonvolatile semiconductor memory, a storage controller generates a specific command as a command for executing the destaging processing, adds each of the pieces of the update data and parameters, each indicating where each of the pieces of the update data is to be stored, to the generated specific command, and transfers the specific command, to which each of the pieces of the update data and the parameters are added, to a memory controller; and the memory controller stores each of the pieces of the update data in the designated block of the nonvolatile semiconductor memory based on the specific command.

Advantageous Effects of Invention

According to the present invention, the amount of data to be stored in a semiconductor nonvolatile memory can be reduced and overhead associated with data processing can be reduced.

BRIEF DESCRIPTION OF DRAWINGS

FIG. 4 is a configuration diagram of a RAID configuration table;

FIG. 5 is a configuration diagram of a stripe management table;

FIG. 6 is a configuration diagram of a cache management table;

FIG. 7 is a configuration diagram of a PDEV-SLOT mapping table;

FIG. 8 is a configuration diagram of an LBA-FM mapping table;

DESCRIPTION OF EMBODIMENTS

Example 1

This embodiment is designed so that when executing destaging processing for writing a plurality of pieces of update data existing in a cache memory to a nonvolatile semiconductor memory, a storage controller generates a specific command as a command for executing the destaging processing, adds each of the pieces of the update data and a plurality of parameters, each indicating where each of the pieces of the update data is to be stored, to the generated specific command, and transfers the specific command, to which each of the pieces of the update data and each of the parameters are added, to a memory controller; and the memory controller stores each of the pieces of the update data in the designated block of the nonvolatile semiconductor memory based on the specific command.

Figure 1:
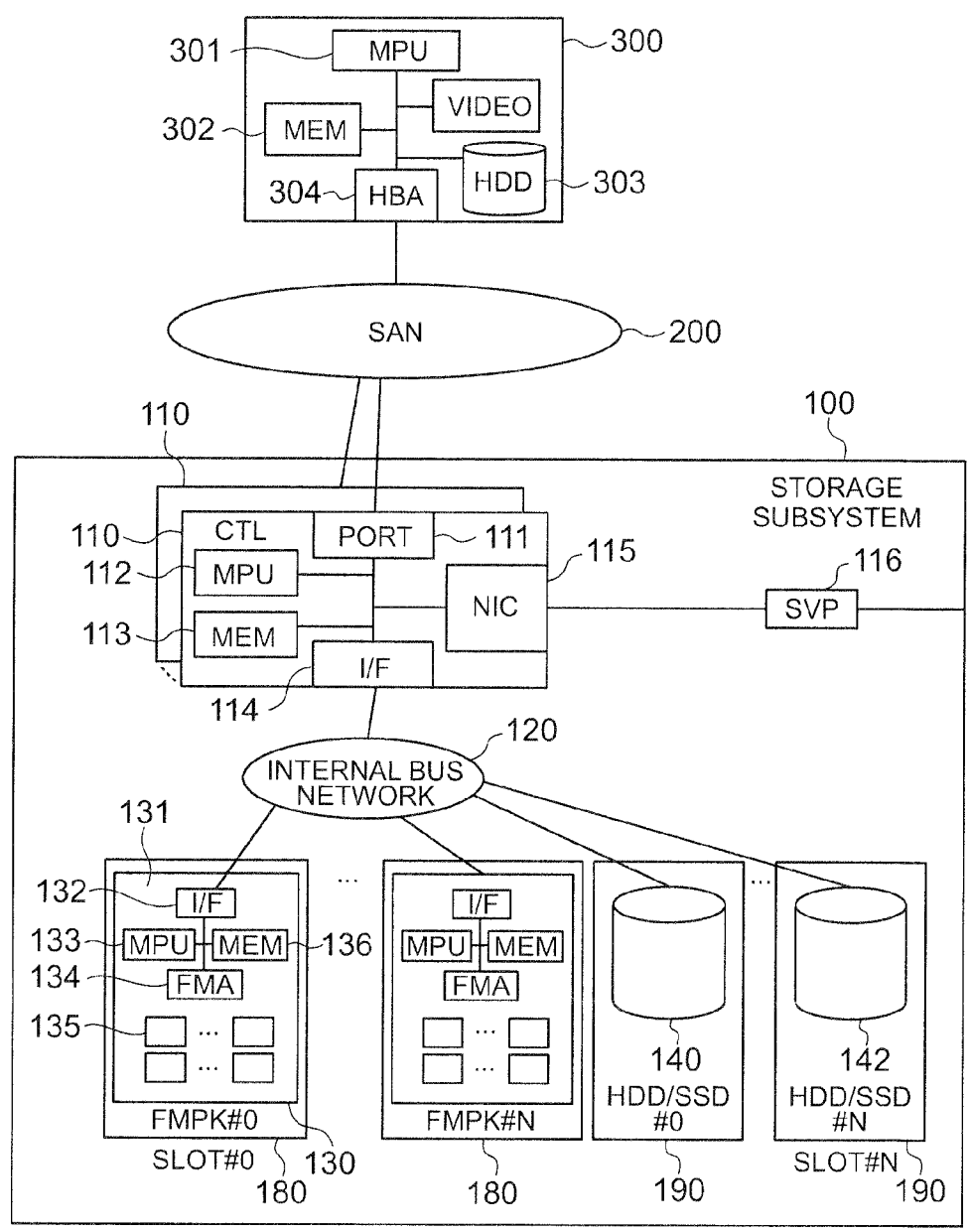
FIG. 1 is a configuration diagram for explaining the physical configuration of a storage system using a storage subsystem according to the first embodiment of the present invention.

FIG. 1 shows the physical configuration of a storage subsystem according to this embodiment and the physical configurations of apparatuses connected to this storage subsystem.

Referring to FIG. 1, a storage subsystem 100 includes a plurality of storage controllers 110, an internal bus network 120, a plurality of flash memory packages (hereinafter referred to as $FMPK$) 130, a plurality of HDDs 140 and SSDs (Solid State Drives) 142.

FMPKs 130 #0 to #N are located in slots 180 #0 to #N, respectively. Each HDD 140 and each SSD 142 serving as storage apparatuses are located separately in any of the slots 190 #0 to #N or are combined and located in the same slot 190 #0 to #N. The FMPKs 130, the HDDs 140, and the SSDs 142 are respectively connected to the internal bus network 120. The slots are divided into the slots 180 for FMPKs and the slots 190 for HDDs/SDDs in this embodiment, but the slots can be shared by FMPKs, HDDs, and SSDs, using the same I/F.

Each storage controller 110 includes a port 111 for connection with a host computer 300 via a network 200, an MPU (Micro Processing Unit) 112 for processing I/O (Inputs-Outputs), a memory (MEM) 113 for storing programs and control information, an interface 114 for sending/receiving data to/from the FMPKs 130, the HDDs 140, and the SDDs 142 via the internal bus network 120, and a network the interface (NIC) 115 for connection with a service processor (SVP) 116.

Incidentally, SAS (Serial Attached SCSI), FC (Fibre Channel), or the like can be used for the interface 114. Also, SAN (Storage Area Network), FC, or iSCSI (Small Computer System Interface over Internet) can be used for the network 200.

The service processor (SVP) 116 is connected to a management console (not shown in the drawing) via, for example, a network (not shown in the drawing). This service processor 116 is designed to load a program, which is input to the management console, to the storage controller 110 and manage the initial settings of the storage controller 110.

Each FMPK 130 includes a memory controller 131 and a plurality of flash memories 135. The memory controller 131 is constituted from an interface 132 connected to the internal bus network 120, a microprocessor (MPU) 133 for executing I/O processing, a flash memory adapter (FMA) 134 for controlling access to data in the flash memories 135 in response to access from the interface 132, and a memory (MEM) 136 for storing data.

The plurality of flash memories 135 are composed of nonvolatile semiconductor memories serving as a plurality of storage apparatuses, and a storage area of each flash memory 135 is divided into a plurality of blocks. Each block is a data storage unit and is constituted from, for example, a user area (192 KB [kilobytes]) for storing data and a log buffer (write buffer) area (64 KB) for temporarily storing write data. When storing data in each block, data whose size is larger than that of the log buffer area is directly stored in the user area by read modify write processing, and data whose size is smaller than that of the log buffer area is temporarily stored in the log buffer area.

The host computer 300 serving as a server computer is constituted from a microprocessor (MPU) 301, a memory (MEM) 302, an HDD 303, and a host bus adapter (HBA) 304 for sending/receiving data via the network 200 to/from the storage subsystem 100. In this case, the host computer 300 generates a command as an I/O request (such as a read request or a write request) using protocol such as FC or iSCSI and sends the generated command to the storage subsystem 100.

Figure 2:
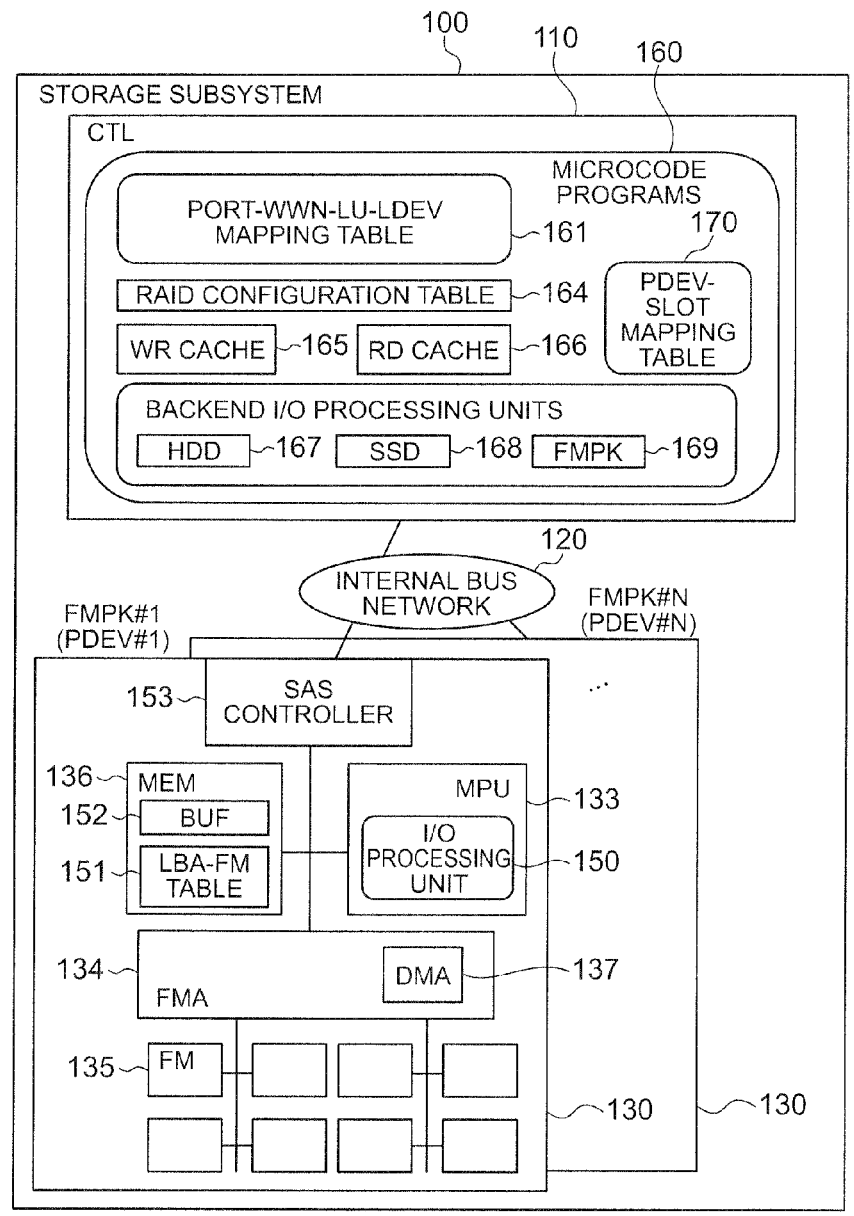
FIG. 2 is a configuration diagram for explaining the logical configuration of the storage subsystem according to the first embodiment of the present invention.

FIG. 2 shows the logical configuration of the storage subsystem according to this embodiment.

Referring to FIG. 2, the storage controller 110 executes microcode programs 160 provided by the service processor (SVP) 116. The microcode programs 160 are supplied to the storage controller 110 as a customer engineer (CE) transfers a storage medium belonging to the service processor (SVP) 116, such as a CD-ROM (Compact Disc Read only Memory), a DVD-ROM (Digital Versatile Disc-Read only Memory), an USB (Universal Serial Bus) memory, to the service processor (SVP) 116.

In this case, the storage controller 110 manages data in each FMPK 130, HDD 140, and SSD 142 according to the microcode programs 160.

For example, the microcode programs 160 manage logical storage areas in the flash memories 135 belonging to the FMPKs 130, using physical devices PDEVs (Physical DEVices), and also use the plurality of physical devices PDEVs to construct a plurality of RAID (Redundant Array of Inexpensive Disks) Groups (RG) and protect data in the flash memories 135 belonging to each RG. A determined management unit such as a stripe string extending across a plurality of 256 KB physical devices PDEVs can be used as a data protection unit. The microcode programs 160 can construct logical devices LDEVs that are logical storage spaces extending across a plurality of physical devices PDEVs.

In other words, the microcode programs 160 construct a plurality of RGs using a plurality of flash memories 135, sets one or more logical devices (LDEVs) to each RG, and provides the set one or more logical devices (LDEVs) to the host computer 300.

For example, the microcode programs 160 can provide the logical devices (LDEVs) in the form of one or more logical units (LUs) as logical storage areas that can be recognized by the host computer 300.

In this case, the host computer 300 is given a WWN (World Wide Name), a port number, and a logical unit number by the microcode programs 160.

The microcode programs 160 include a PORT-WWN-LU-LDEV mapping table 161, a RAID configuration table 164, a write cache 165, a read cache 166, backend I/O processing units 167, 168, 169, and a PDEV-SLOT mapping table 170 in order to send/receive information to/from the host computer 300 and send/receive data to/from the FMPKs 130, HDDs 140, and SSDs 142. The detailed content of these tables will be explained later.

Meanwhile, each FMPK 130 includes: an I/O processing unit 150 for the microprocessor 133 to execute I/O processing; a network controller 153 for controlling data and commands input via the internal bus network 120; a buffer 152 for temporarily storing data and commands received by the network controller 153; an LBA-FM table 151 that is a mapping table for performing address conversion between logical block addresses (LBAs) on the FMPKs 130 and blocks in the flash memories 135; and a data control unit (Direct Memory Access [DMA]) 137 for transferring data independently from the microprocessor 133.

Figure 3:
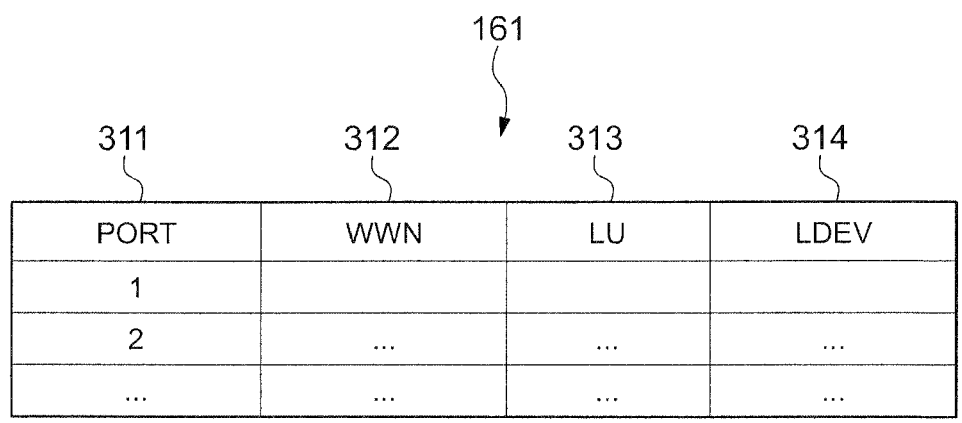
FIG. 3 is a configuration diagram of a Port-WWN-LU-LDEV mapping table.

FIG. 3 shows the Port-WWN-LU-LDEV mapping table 161. This table 161 is constituted from a port number 311, a WWN number 312, an LU number 313, and an LDEV number 314 corresponding to the relevant port 111. This Port-WWN-LU-LDEV mapping table 161 maps the correspondence relationship between the ports 111, WWNs, LUs, and LDEVs. When the host computer 300 designates the WWN number 312, the microcode programs 160 list up the LU numbers 313 corresponding to the WWN number 312 and selects the LDEV numbers 314 corresponding to the listed LU numbers 313. The WWN number 312 is a 64-bit address (XX:YY:ZZ:AA:BB:CC) assigned to, for example, the host bus adapter (HBA) 304 or an FC switch.

Figure 4:
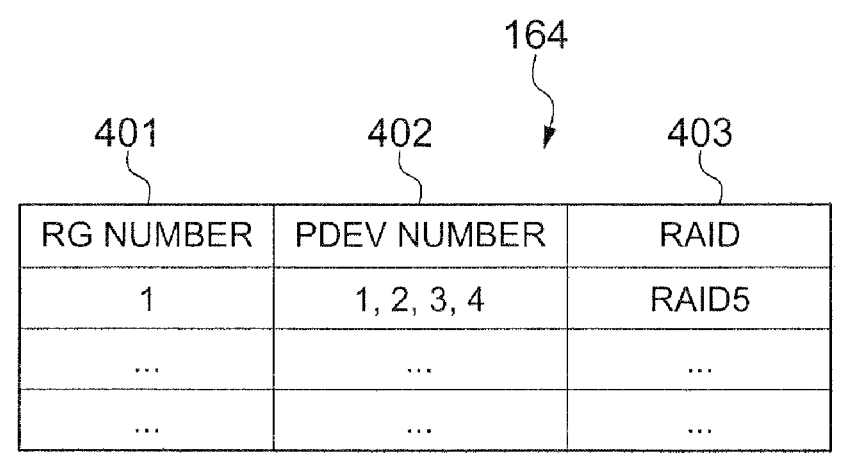

FIG. 4 shows the RAID configuration table 164. The RAID configuration table 164 is constituted from an RG number 401, a PDEV number 402, and a RAID number 403. Regarding the first entry of the RAID configuration table 164, it is shown that RG (RAID Group) 1 constitutes RAID5 (RAID level 5) using PDEVs 1, 2, 3, and 4.

FIG. 5 shows the stripe management table 165. The stripe management table 165 is a table that is stored, together with the RAID configuration table 164, in the microcode programs 160 and is constituted from an LDEV number 501, an RG number 502, a stripe line start number 503, and a stripe line end position number 504. This stripe management table 165 is constructed as a table showing the stripe start position and the stripe end position of the relevant logical device LDEV in the RG. In this case, the size of a stripe is assumed to be 256 KB per storage medium such as a flash memory 135.

FIG. 6 shows the cache management table 167. The cache management table 167 is a table for managing the write cache 165 and the read cache 166 and is constituted from a cache slot number 601, a memory address number 602, and a bitmap table address 603. When the memory 113 is used as a cache memory, the cache slot number 601 indicates the number of a cache slot formed in this cache memory 113. The memory address 602 indicates the address in the cache memory 113, and the bitmap table address 603 indicates the bitmap address in the cache memory. One bit per 512 bytes of a cache slot is used as the bitmap address. Incidentally, the cache management table 167 is stored in the microcode programs 160.

FIG. 7 shows the PDEV-SLOT mapping table 170. The PDEV-SLOT mapping table 170 is a table showing the correspondence relationship between PDEVs and slots 180, 190 and is constituted from a PDEV number 701, a slot number 702, and a device type (PDEV attribute) 703. In this case, regarding the first entry of the PDEV number 701, slot #1 is assigned to PDEV #1 and the FMPK 130 is assigned as a device. Also, the slot number #200 is assigned to PDEV #200 and the SSD 142 is assigned as a storage device. Furthermore, the slot number #300 is assigned to PDEV #300 and the HDD 140 is assigned as a storage device.

FIG. 8 shows the LBA-FM mapping table 151 that is set for the FMPKs 130. The LBA-FM mapping table 151 is a table that maps logical block addresses (LBAs) associated with pages on the flash memories 135 and is constituted from an LBA 801, a flash memory (FM) number 802, a block (BLK) number 803, a page number 804, an a start byte on the relevant page 805.

When the storage controller designates an LBA, the LBA-FM mapping table 151 is used as a table for searching for a flash memory number 802, a block number 803, a page number 804 within the block page, and a start byte (start block) on the relevant page, all of which correspond to the designated LBA 801. In other words, the I/O processing unit 150 for the microprocessor 133 can read or write data stored in the start block on the designated page, starting from the start block by referring to the LBA-FM mapping table 151.

Each block is composed of 256 KB and each page is composed of 2 KB. Incidentally, the block size and the page size are determined by physical limitations on the flash memory 135, and the block size may be 512 KB and the page size may be 4 KB.

When an HDD 140 is an access target, the backend I/O processing unit 167 generates a command for accessing the HDD 140 and accesses the HDD 140 according to the generated command. When an SSD 142 is an access target, the backend I/O processing unit 168 generates a command for accessing the SSD 142 and accesses the SSD 142 according to the generated command.

When an FMPK 130 is an access target, the backend I/O processing unit 169 generates a specific command (Command Descriptor Block [CDB]), which is different from the command for accessing the HDD 140 or the SSD 142, for accessing the flash memory 135 in the FMPK 130 and then sends the generated specific command to the FMPK 130 via the internal bus network 120.

Figure 9A:
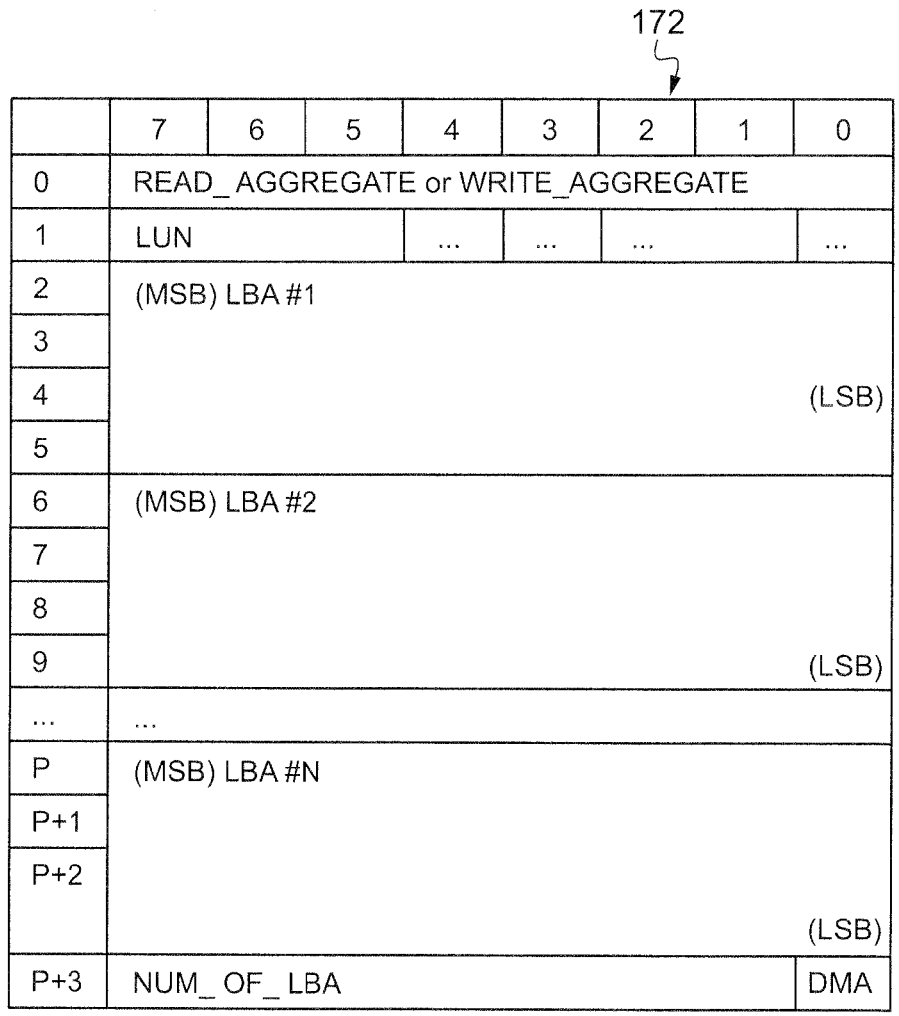
FIG. 9A is a configuration diagram of a command list.
Figure 9B:
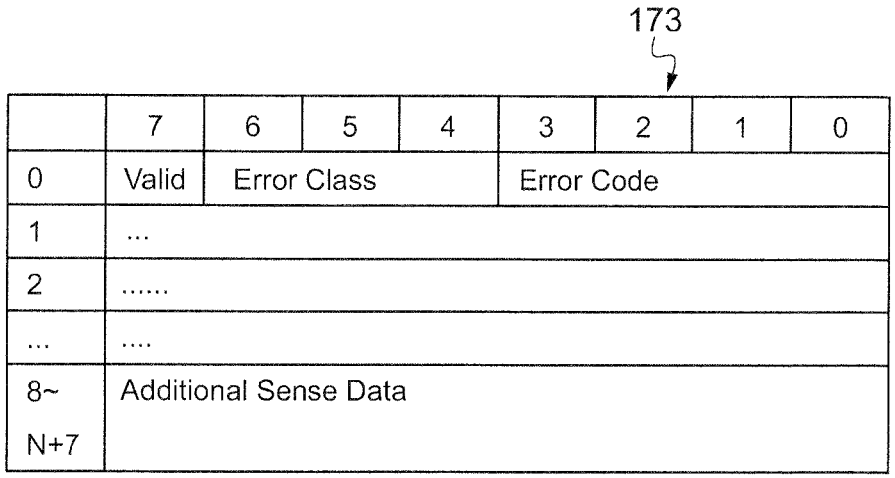
FIG. 9B is a configuration diagram of a sense data list.

At this point in time, the backend I/O processing unit 169 generates, as the specific command, a command list 172 and a sense data list 173 associated with the command list 172 as shown in FIG. 9A and FIG. 9B.

Referring to FIG. 9A, field #0 of the command list 172 stores a command name indicating a read command or a write command; field #1 stores an LUN (LU number); and four bytes of fields #2 to #5 store LBA #1. Similarly, fields #6 to #9 store LBA #2. Also, fields #P to #P+2 stores LBA #N. Furthermore, field #P+3 stores the number (NUM) of LBAs.

Meanwhile, referring to FIG. 9B, field #0 in the sense data list 173 stores information indicating whether a failure has occurred or not during data storage processing, that is, $1$ in the case of a success or $0$ in the case of a failure, as well as an error class and an error code. Fields #8 to #N+7 store the content of a failure as additional sense data when the failure has occurred, in association with the LBAs #1 to #N.

Figure 10:
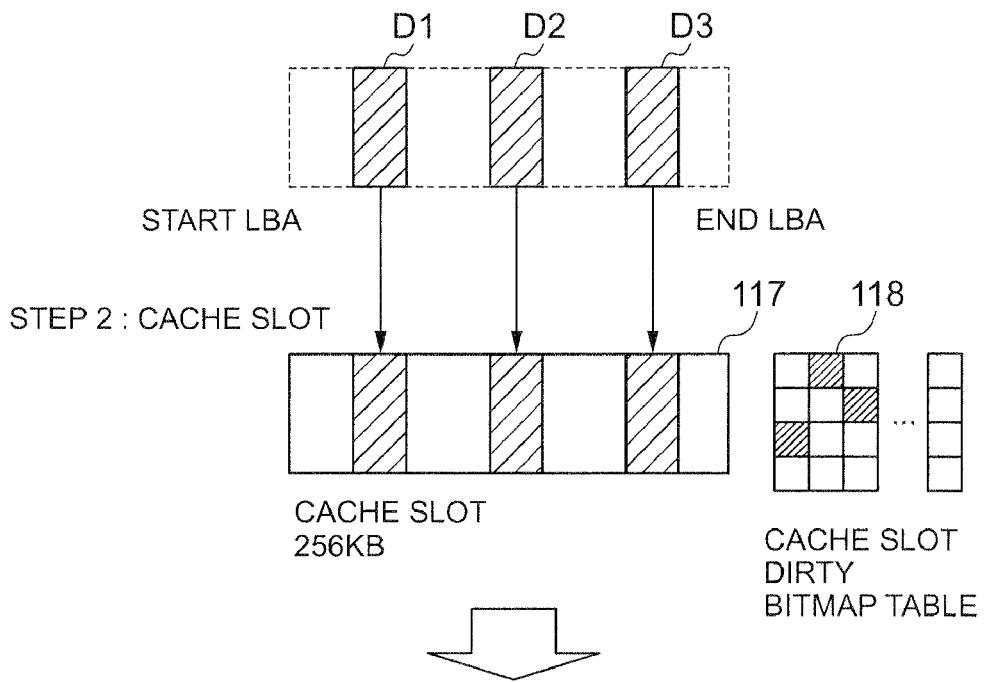
FIG. 10 is a conceptual diagram illustrating write processing executed by a storage controller.

Next, the outline of data write processing executed by the microprocessor 112 for the storage controller 110 will be explained with reference to FIG. 10.

If there are a plurality of pieces of write data, for example, three pieces of data D1, D2, and D3, in response to a write request from the host computer 300, the microprocessor 112 performs step 1 of reading LBAs for the respective pieces of data D1, D2, D3 as a write I/O access, and step 2 of managing the respective pieces of data D1 to D3 by associating them with their positions in a cache slot 117, using the bitmap table 118. When doing so, the microprocessor 112 manages the data D1, D2, D3 as update data (dirty data) in the cache memory 113.

Subsequently, when executing destaging processing for storing the data D1 to D3 in the flash memory 135, the microprocessor 112 performs step 3 of generating a specific command CMD, adding addresses ADD1, ADD2, ADD3 indicating where the data D1, D2, D3 are to be stored to the specific command CMD, also adding the data D1, D2, D3 to the specific command CMD, and sending the specific command CMD, to which the addresses ADD1, ADD2, ADD3 and the data D1, D2, D3 are added, to the designated FMPK 130 via the internal bus network 120.

Figure 11:
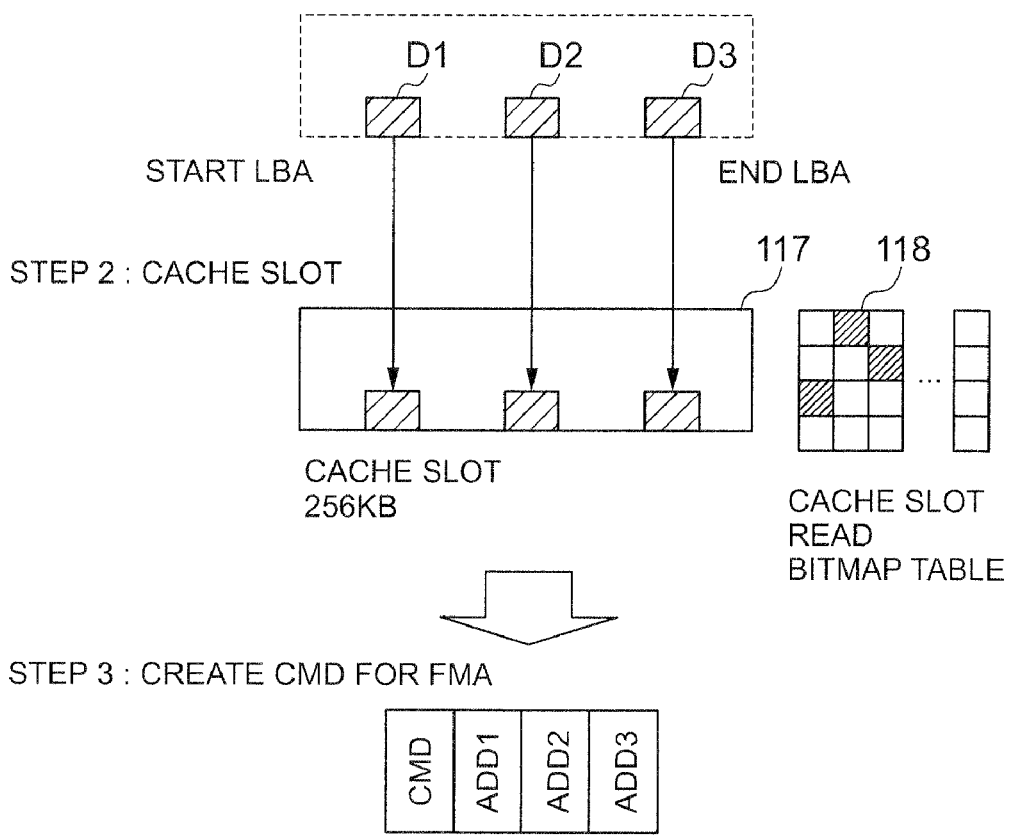
FIG. 11 is a conceptual diagram illustrating read processing executed by the storage controller.

Next, the outline of read processing executed by the microprocessor 112 will be explained with reference to FIG. 11.

When there are a plurality of read data in response to a read request from the host computer 300, the microprocessor 112 first reads LBAs corresponding to the data D1, D2, D3 as a read I/O access and stores the data D1 to D3 respectively in the cache slot 117; and then manages the respective pieces of data D1 to D3 by associating them with their positions in the cache slot 117, using the bitmap table 118. Subsequently, in step 3, the microprocessor 112 generates a command CMD, adds the read addresses ADD1, ADD2, ADD3 corresponding to the data D1, D2, D3 to the command CMD, and sends the command CMD, to which the addresses ADD1, ADD2, ADD3 are added, to the designated FMPK 130.

Next, processing executed by the memory controller receiving the specific command will be explained with reference to FIGS. 12A and 12B.

Figure 12A:
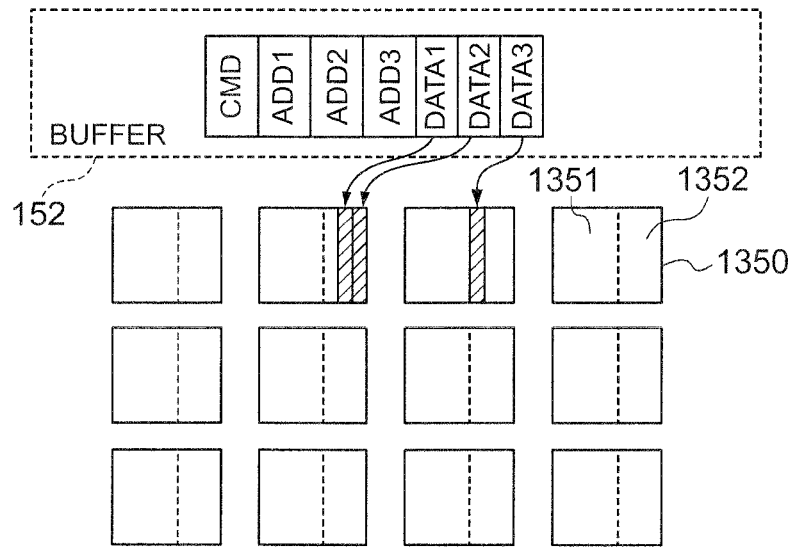
FIG. 12A is an operation explanatory diagram for explaining processing executed by a memory controller.

As shown in FIG. 12A, the microprocessor 133 for the memory controller 131 in the FMPK 130 stores the specific command CMD from the microprocessor 112 in the buffer 152. If each piece of the data D1, D2, D3 can be stored in the log buffer area 1352 which is smaller than the capacity of the user area 1351 in a block 1350 in the above-described situation, the microprocessor 133 stores each piece of the data D1 to D3 in the log buffer area 1352 in the designated block 1350.

Figure 12B:
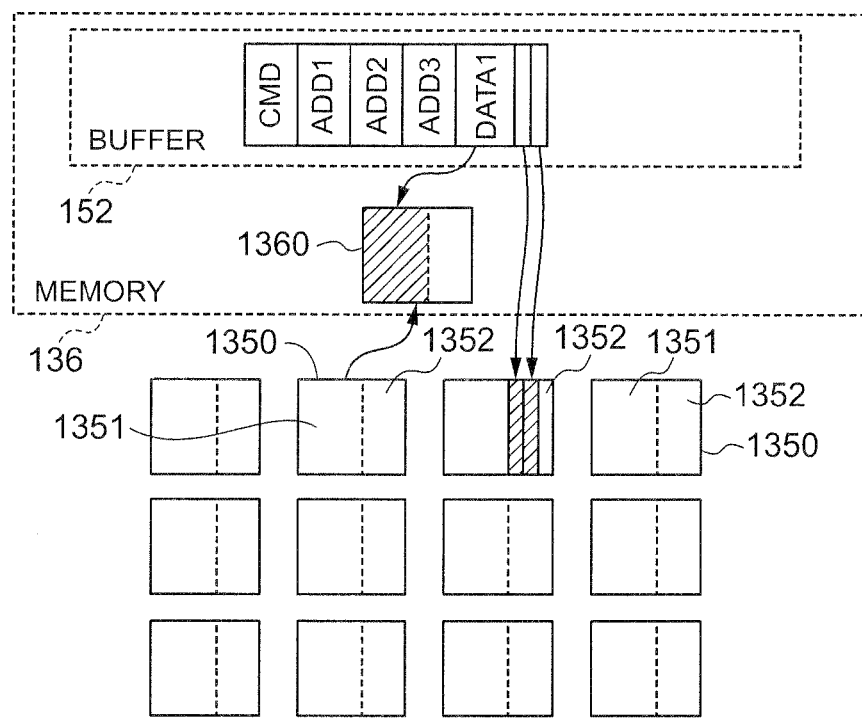
FIG. 12B is an operation explanatory diagram for explaining another processing executed by the memory controller.

On the other hand, if the capacity of the data D1 is larger than that of the log buffer area 1352 as shown in FIG. 12B, the microprocessor 133 reads the data D1 into the block 1360 in the memory 136, reads data from the user area 1351 in the block 1350 where the data D1 is to be stored, into the block 1360, overwrites the data read from the user area 1351 with the data D1, and then stores the overwritten data as update data in the user area 1351 in the block 1350. Incidentally, if the data D2, D3 can be stored in the log buffer area 1352, the data D2, D3 are stored in the log buffer area 1352.

Figure 13:
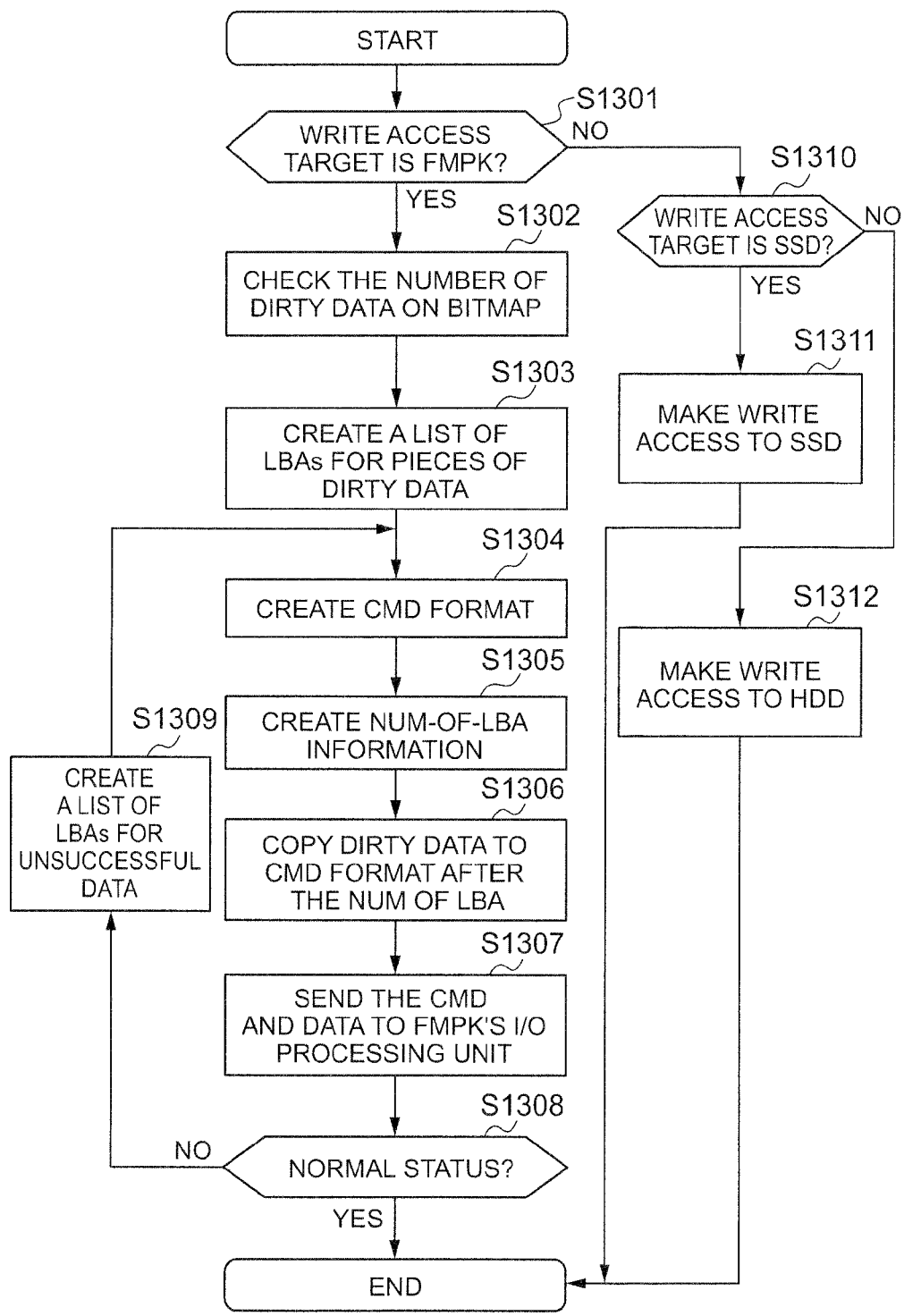
FIG. 13 is a flowchart for explaining write processing executed by the storage controller.

Next, write processing executed by the storage controller 110 will be explained with reference to FIG. 13.

This processing is started by execution of the microcode programs 160 by the microprocessor 112 at the time of the destaging processing. The microprocessor 112 first judges, in response to a write request from the host computer 300, whether the write access target is an FMPK 130 or not (S1301); and if it is determined, based on the device type 703 in the PDEV-SLOT mapping table 170 as identified by specifying the RG from the LU number 313 in the Port-WWN-LU-LDEV mapping table 161 and specifying the slot number from the RG number 401 in the RAID configuration table 164, that the write access target is the FMPK 130, the microprocessor 112 refers to the bitmap table 118 and checks the number of pieces of update data in the bitmap table 118, that is, the number of pieces of update data (dirty data) in the cache slot 117 (S1302).

Subsequently, the microprocessor 112 inputs a list of LBAs corresponding to the respective pieces of the update data to the command list 172 based on the check result (S1303), then inputs the format of the command to the command list 172 (S1304), creates information about the number of LBAs and inputs the number of LBAs to the command list 172 (S1305).

The microprocessor 112 then writes the update data after the number of LBAs and in association with the command format (S1306) and sends the specific command including the update data and the addresses indicating the storage locations of the update data to the I/O processing unit 150 for the FMPK 130 (S1307).

Next, the microprocessor 112 judges whether or not status information indicating a normal status has been returned from the I/O processing unit 150 (S1308); and if the status information indicating the normal status has been returned, the microprocessor 112 terminates the processing in this routine.

On the other hand, if a failure has occurred and status information indicating an abnormal status has been returned, the microprocessor 112 executes processing for generating a new list of LBAs relating to the update data, for which the write processing has failed, in order to execute the write processing again (S1309), and repeats the processing in steps S1304 to S1308 based on the newly generated list of LBAs.

Meanwhile, if the microprocessor 112 determines in step S1301 that the write access target is not the FMPK 130, the microprocessor 112 judges whether the write access target is an SSD 142 or not (S1310); and if it is determined, based on the device type 703 in the PDEV-SLOT mapping table 170 as identified by specifying the RG from the LU number 313 in the Port-WWN-LU-LDEV mapping table 161 and specifying the slot number from the RG number 401 in the RAID configuration table 164, that the write access target is the SSD 142, the microprocessor 112 executes processing for making write access to the SSD 142 which have been written in background art section (S1311).

Figure 14:
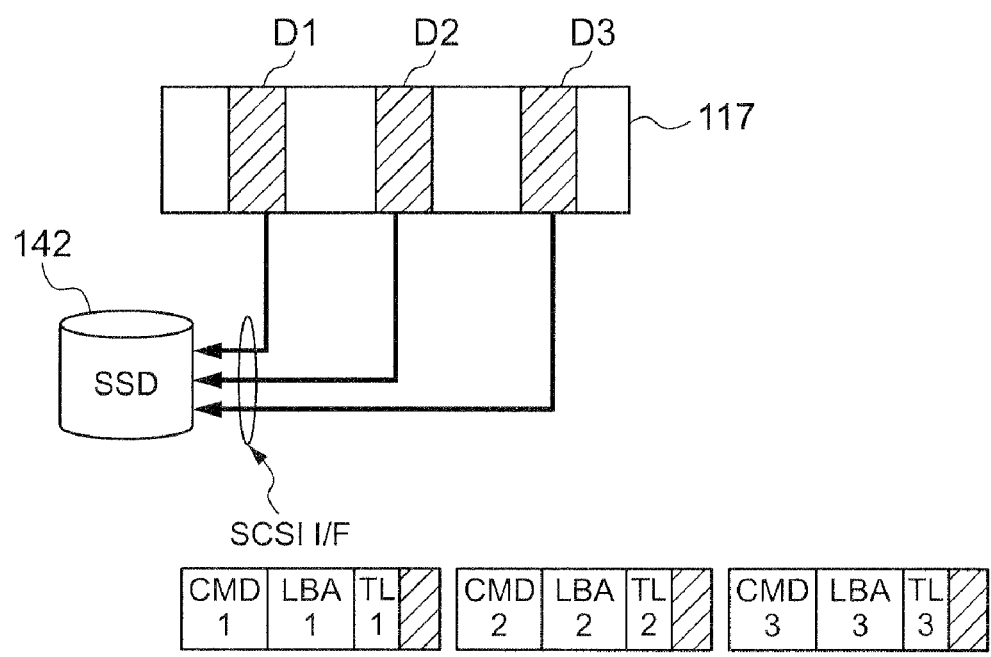
FIG. 14 is a conceptual diagram for explaining a write access to an SSD.

If the pieces of the update data (dirty data) D1, D2, D3 exist in the cache slot 117 as shown in FIG. 14 in the above-described situation, the microprocessor 112 generates commands CMD1, 2, 3 corresponding to the pieces of update data D1, D2, D3 respectively and executes processing for storing each piece of update data D1, D2, D3 individually in the SSD 142 according to each command CMD1, 2, 3.

If the microprocessor 112 determines in step S1310 that the write access target is not the SSD 142, it determines that the write access target is an HDD 140, and then executes processing for making write access to the HDD 140 which have been written in background art section (S1312).

Figure 15:
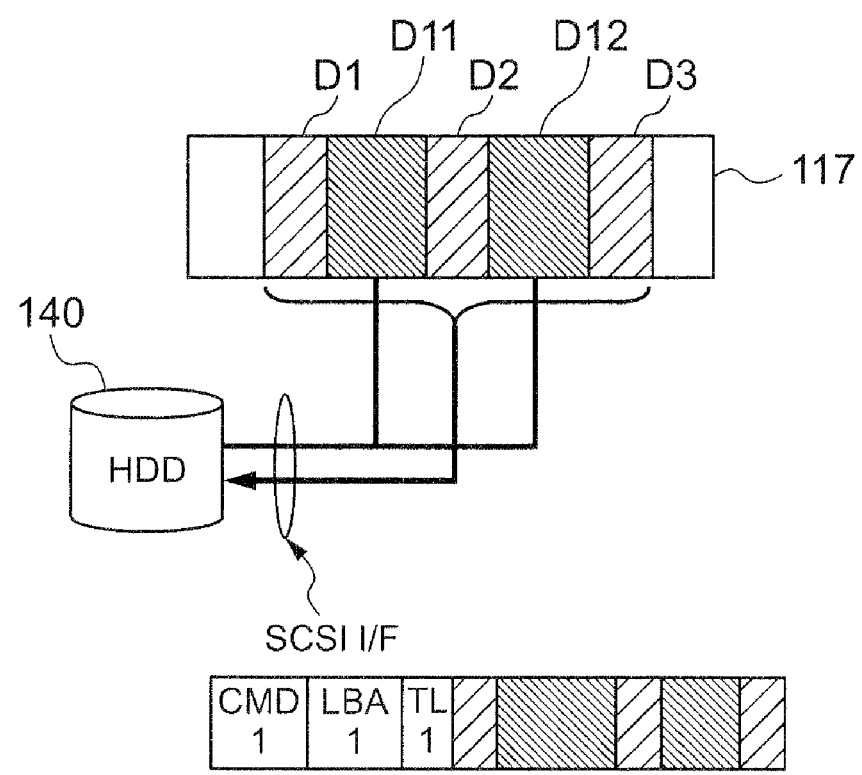
FIG. 15 is a conceptual diagram for explaining a write access to an HDD.

If pieces of sparced data D11, D12 exist in addition to the pieces of update data (dirty data) D1, D2, D3 in the cache slot 117 as shown in FIG. 15 in the above-described situation, the microprocessor 112 generates a command CMD1 for storing the update data D1 to D3 and the sparced data D11, D12 as a continuous data group and executes processing for writing the update data D1 to D3 and the sparced data D11, D12 collectively to the HDD 140 in accordance with the generated command CMD1.

Figure 16:
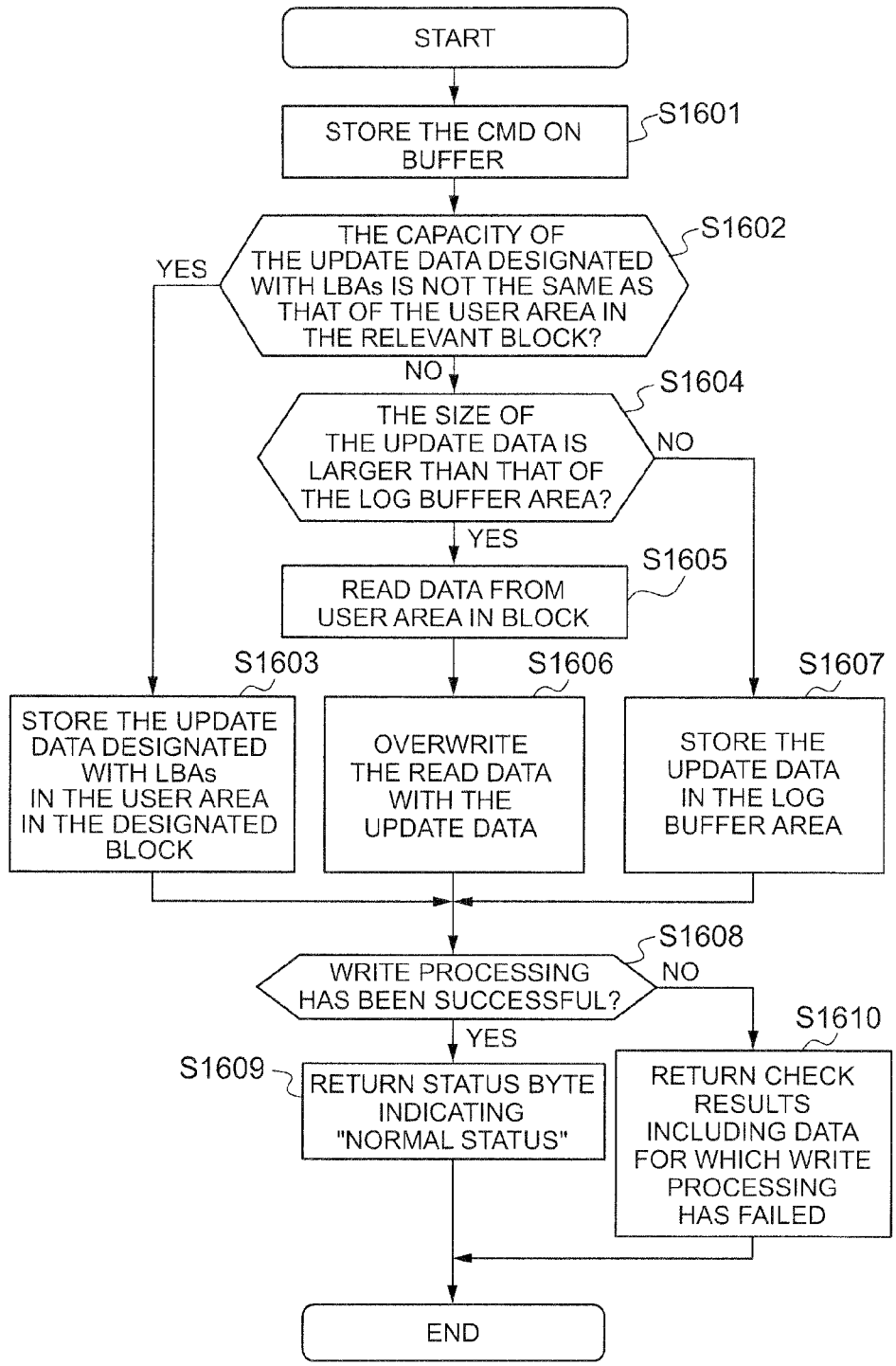
FIG. 16 is a flowchart for explaining write processing executed by the memory controller.

Next, write processing executed by the memory controller 131 will be explained in accordance with the flowchart in FIG. 16.

This processing is started by the microprocessor 133 when executing the destaging processing. The microprocessor 133 for the memory controller 131 first stores the specific command from the storage controller 110 in the buffer 152 (S1601).

Next, the microprocessor 133 judges whether the capacity of the update data designated with LBAs is not the same as that of the user area 1351 in the block 1350 (S1602); and if it is determined that the capacity of the update data designated with LBAs is the same as that of the user area 1351 in the block 1350 (Yes), the microprocessor 133 stores the update data designated with the LBAs in the user area 1351 in the block 1350 (S1603) and then proceeds to step S1608. If it is determined that the capacity of the update data designated with LBAs is not the same as that of the user area 1351 in the block 1350 (No), the microprocessor then judges whether or not the capacity of the update data designated with the LBAs is larger than that of the log buffer area 1352 in the block 1350 (S1604).

If the size of the update data (data size) is larger than that of the log buffer area 1352, the microprocessor 133 reads data stored in the user area 1351 in the block 1350 where the update data is to be stored (S1605), overwrites the read data with the update data (S1606), stores the data overwritten with the update data in the user area 1351, and then proceeds to step S1608.

On the other hand, if it is determined in step S1604 that the size of the update data is smaller than the log buffer area 1352, the microprocessor 133 stores the update data in the log buffer area 1352 in the designated block 1350 (S1607) and then proceeds to step S1608.

The microprocessor 133 judges in step S1608 whether the processing for writing the data to the designated block 1350 has been successful or not; and if it is determined that the write processing has been successful, the microprocessor 133 writes $0$ as information indicating the success of the write processing to field #0 in the sense data list 173 (see FIG. 9B), returns status information (indicating a normal status) indicating the success of the write processing as a check result to the storage controller 110 (S1609), and then terminates the processing in this routine.

On the other hand, if it is determined that the write processing has failed, the microprocessor 133 writes data relating to the update data, regarding which the write processing has failed, as additional sense data to the sense data list 173 (see FIG. 9B), also writes $1$ as information (Valid) indicating the failure in the write processing, to field #0, returns these check results to the storage controller 110 (S1610), and then terminates the processing in this routine.

Figure 17:
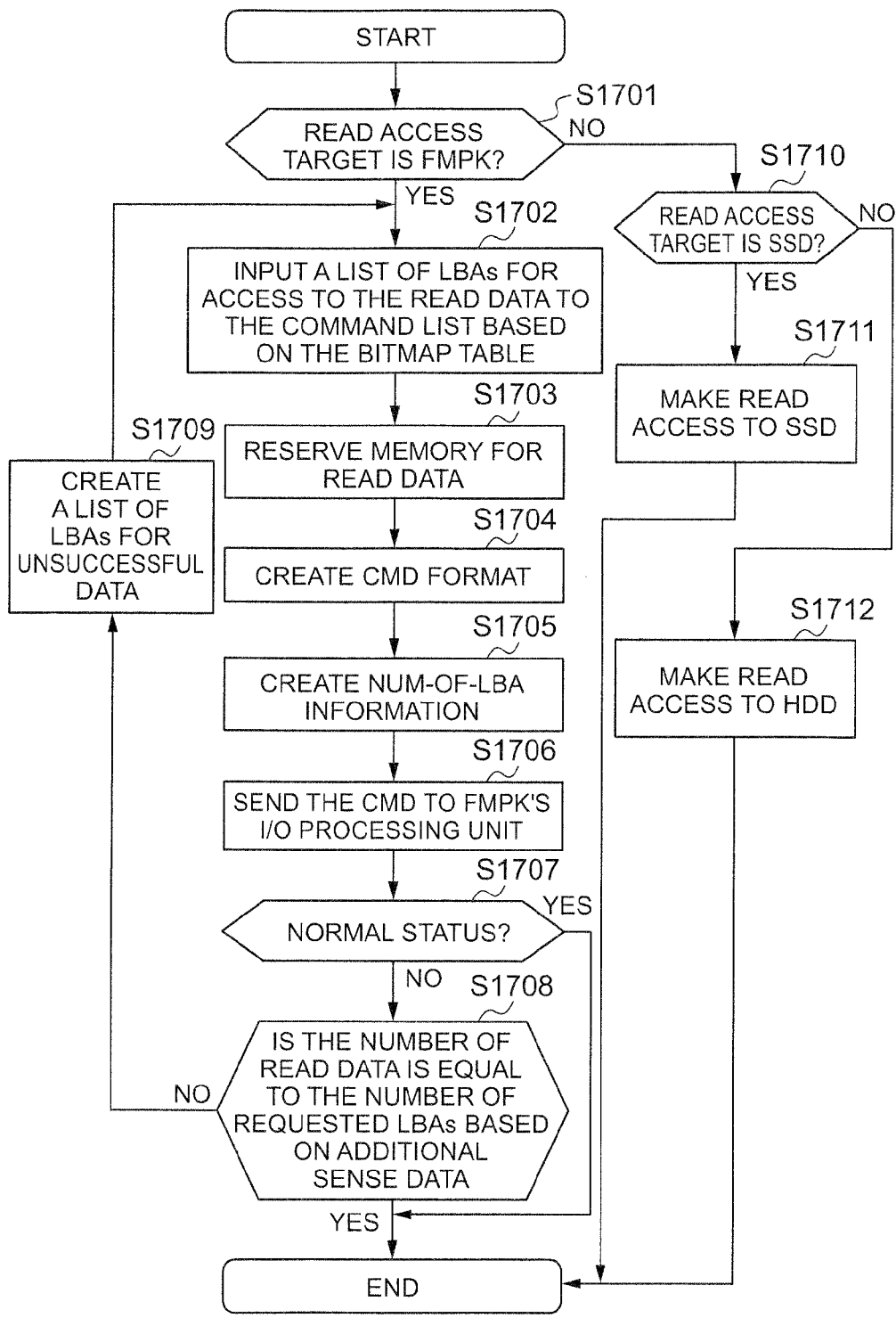
FIG. 17 is a flowchart for explaining read processing executed by the storage controller.

Next, read processing executed by the storage controller 110 will be explained in accordance with the flowchart in FIG. 17.

This processing is started by execution of the microcode programs 160 by the microprocessor 112. The microprocessor 112 first judges, in response to a read request from the host computer 300, whether the read access target is the FMPK 130 or not (S1701); and if it is determined that the read access target is the FMPK 130, the microprocessor 112 inputs a list of LBAs for accessing the read data to the command list 172 based on the bitmap table 118 (S1702), and reserves an area in the cache memory 113, to which the read data is to be read (S1703).

Subsequently, the microprocessor 112 inputs the format of a command CMD for making read access to the read data, to the command list 172 (S1704), creates information about the number of LBAs and inputs the number of LBAs to the command list 172 after the list of LBAs (S1705), and then transfers the command including information input to the command list 172 to the I/O processing unit 150 for the designated FMPK 130 (S1706).

Next, the microprocessor 112 judges whether or not status information indicating a success has been returned from the FMPK 130 which is the transfer destination (S1707); and if the status information indicating the success has been returned, the microprocessor 112 terminates the processing in this routine.

On the other hand, if the status information indicating a failure has been returned, the microprocessor 112 judges, based on the data written to the sense data in the sense data list 173, whether the number of pieces of read data is equal to the number of the requested LBAs or not (S1708); and if the number of pieces of read data is equal to the number of the requested LBAs, the microprocessor 112 terminates the processing in this routine. If the number of pieces of read data is not equal to the number of the requested LBAs, the microprocessor 112 generates a list of LBAs for the pieces of the unsuccessful read data as retry processing (S1709), and then repeats the processing in step S1702 to S1708 based on the generated list.

If it is determined in step S1701 that the read access target is not the FMPK 130, the microprocessor 112 judges whether the read access target is an SSD 142 or not (S1710); and if it is determined, based on the device type 703 in the PDEV-SLOT mapping table 170 as identified by specifying the RG from the LU number 313 in the Port-WWN-LU-LDEV mapping table 161 and specifying the slot number from the RG number 401 in the RAID configuration table 164, that the read access target is the SSD 142, the microprocessor 112 executes the processing for making read access to the SSD 142 (S1711), and then terminates the processing in this routine.

On the other hand, if it is determined that the read access target is not the SSD 142, the microprocessor 112 determine that the read access target is an HDD 140 and executes the processing for making read access to the HDD 140 (S1712), and then terminates the processing in this routine.

Figure 18:
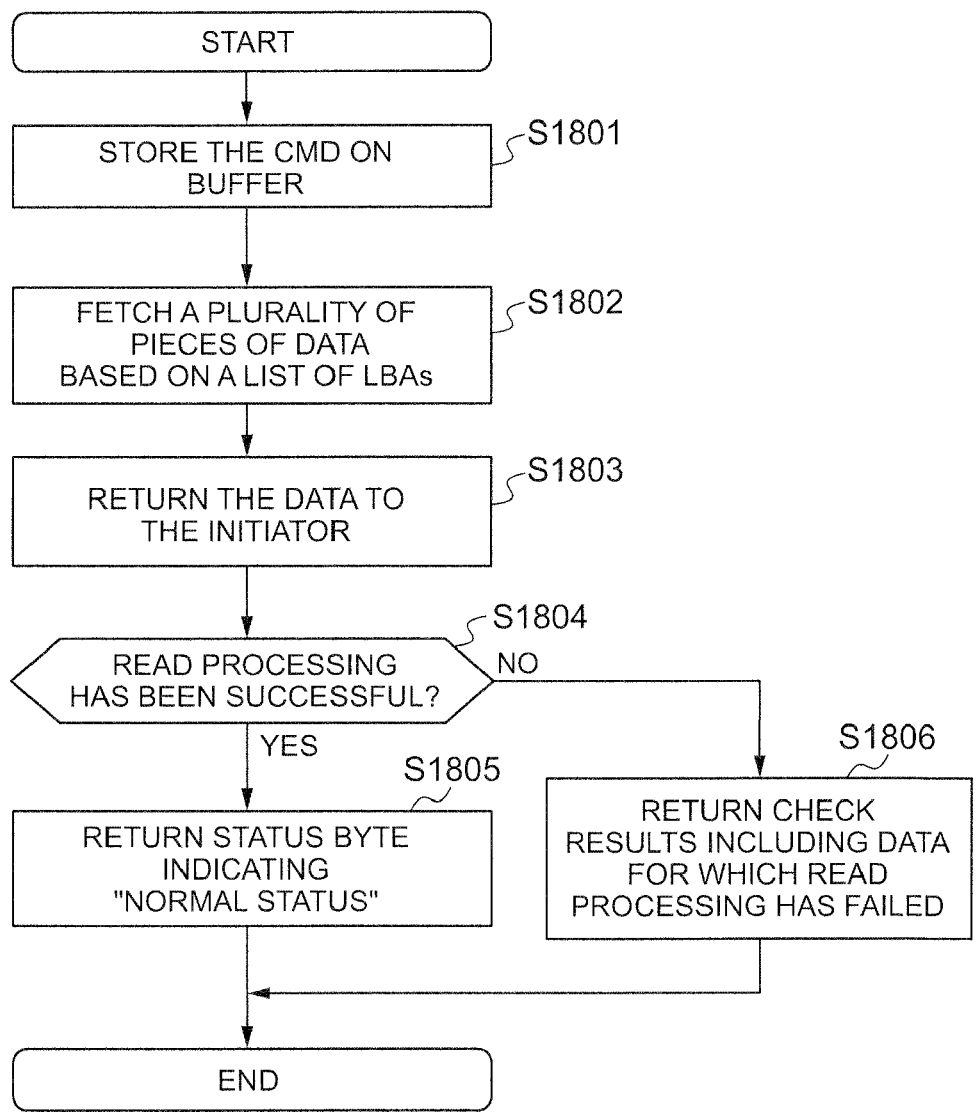
FIG. 18 is a flowchart for explaining read processing executed by the memory controller.

Next, read processing executed by the memory controller 131 will be explained in accordance with the flowchart in FIG. 18.

This processing is executed by the microprocessor 133 for the FMPK 130. The microprocessor 133 for the memory controller 131 first stores the command sent from the storage controller 110 in the buffer 152 (S1801).

Subsequently, the microprocessor 133 fetches pieces of data, which are the read access targets, based on the list of LBAs attached to the command stored in the buffer 152 (S1802), returns the fetched read data to the storage controller 110, which is the initiator (S1803), and then judges whether the read processing has been successful or not (S1804). Incidentally, if the read access target data is log data relating to the user data, the microprocessor 133 may also read the log data, merge the log data and the user data together, and return the merged data in steps S1802 and S1803.

If the read processing has been successful, the microprocessor 133 returns status information indicating a success of the read processing to the storage controller 110 (S1805), and then terminates the processing in this routine.

On the other hand, if it is determined that the read processing has failed, the microprocessor 133 returns the list relating to the LBAs for the read data based on the additional sense data in the sense data list 173 as well as the status information indicating the failure in the read processing to the storage controller 110 (S1806), and then terminates the processing in this routine.

According to this embodiment, the amount of data to be stored in the flash memory 135 can be reduced and overhead pertaining to the processing for storing the data in the flash memory 135 can be reduced.

Example 2

The second embodiment of the present invention will be explained below. This embodiment is designed so that when executing destaging processing for writing a plurality of pieces of update data, which exist in a cache memory, to a flash memory, a storage controller generates transfer parameters including the addresses for the pieces of the update data in the cache memory, addresses (flash memory addresses) where the update data are to be stored, and the size of the data, and transfers the generated transfer parameters to a data control unit (DMA); and the data control unit reads the update data from the cache memory in accordance with the transfer parameters and stores the read update data in the designated blocks in the flash memory.

Figure 19:
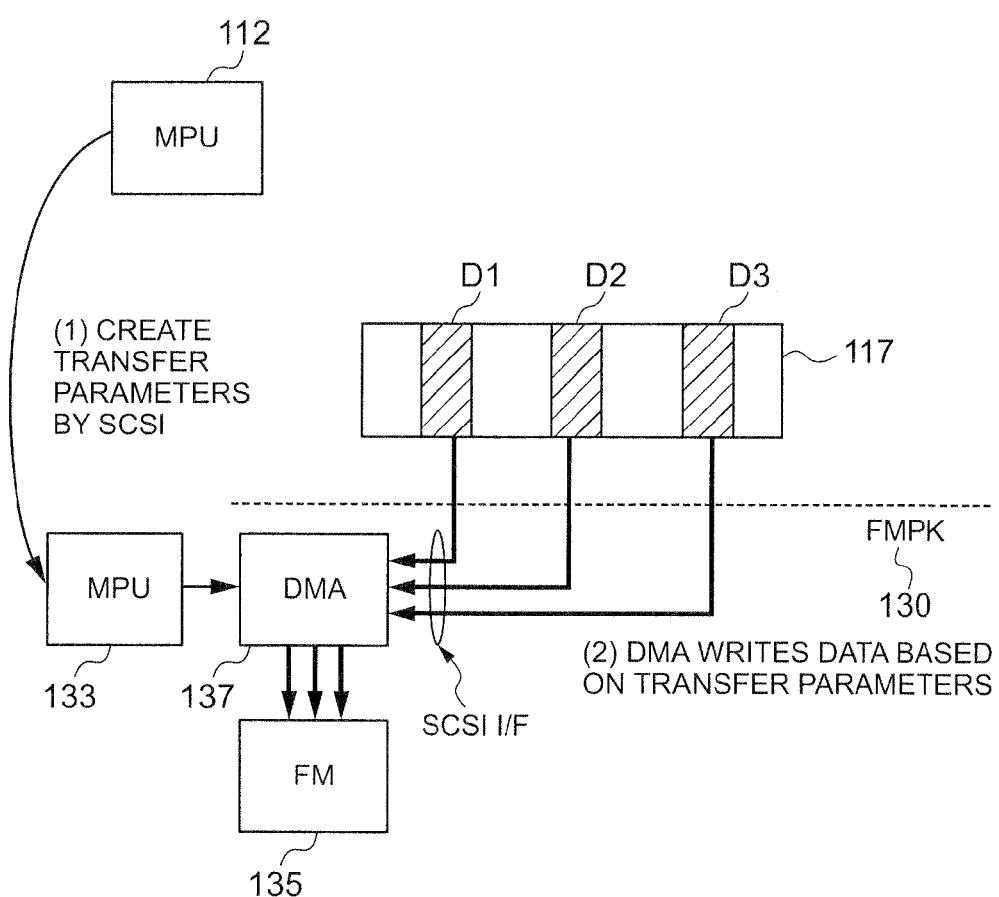
FIG. 19 is a conceptual diagram according to the second embodiment of the present invention.

Next, the outline of the second embodiment will be explained with reference to FIG. 19. This embodiment is designed so that if a plurality of pieces of the update data D1 to D3 exist in the cache memory at the time of destaging processing, the microprocessor 112 for the storage controller 110 generates transfer parameters, each including the address of each piece of update data D1 to D3 in the cache memory and the address at which each piece of update data is to be stored, and sends the generated transfer parameters to the microprocessor 133 for the FMPK 130; and the microprocessor 133 transfers the received transfer parameters to the data control unit (DMA) 137. The data control unit 137 fetches the update data D1, D2, D3 from the cache slot 117 and stores the update data D1, D2, D3 in the designated blocks 1350 in the flash memory 135 based on the transfer parameters.

Figure 20:
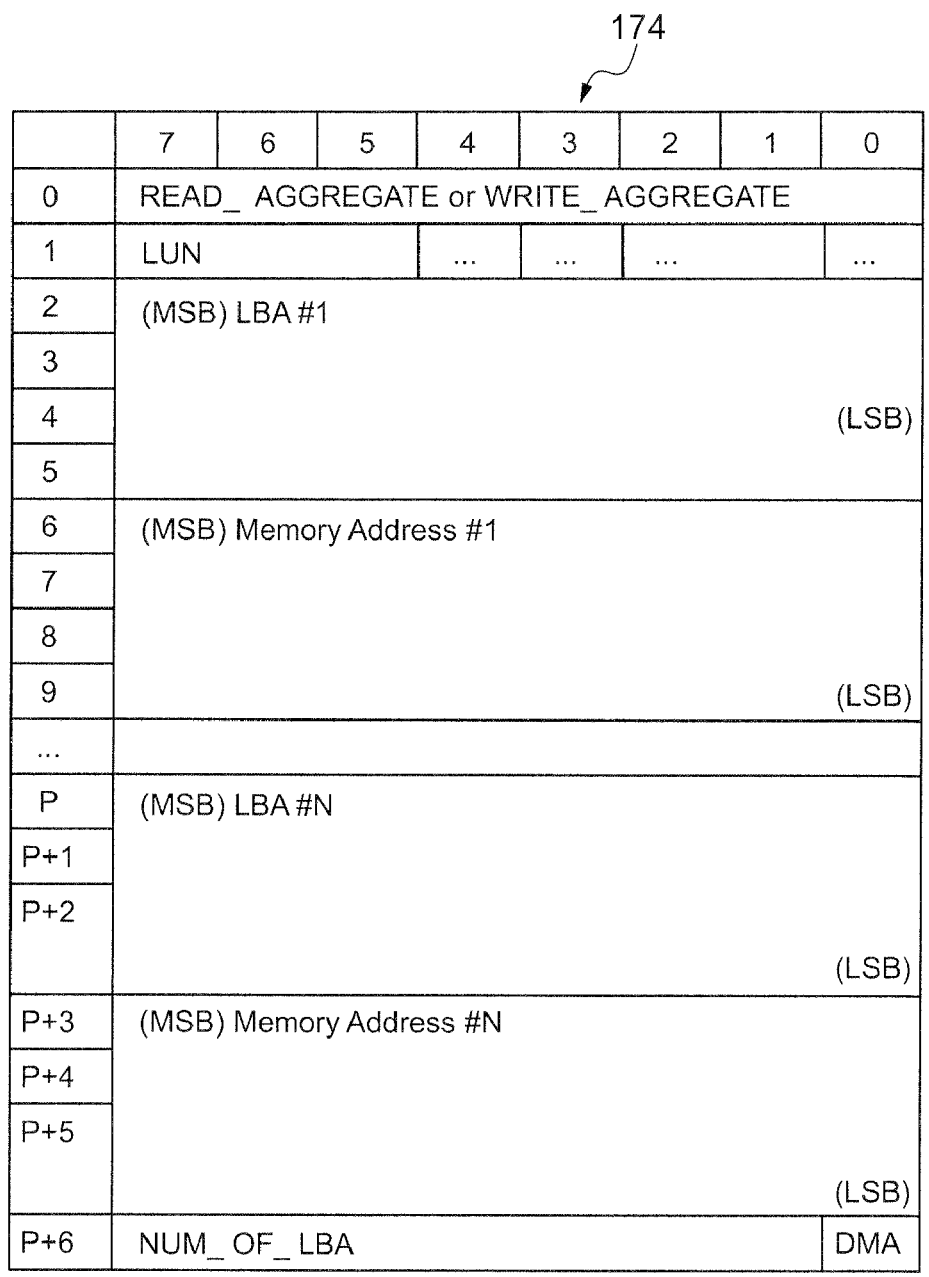
FIG. 20 is a conceptual diagram of a command list used in the second embodiment of the present invention.

When executing the above-described processing, the microprocessor 112 generates a command list 174 as shown in FIG. 20. A specific command CMD based on the transfer parameters is input to this command list 174 according to a CDB (Command Descriptor Block) system.

Field #0 in the command list 174 stores a command name indicating a read command or a write command; field #1 stores an LUN; fields #2 to #5 store LBA #1; and fields #6 to #9 store the memory address #1. Also, fields #P to #P+2 stores LBA #N and fields #P+3 to #P+5 store the memory address #N. Furthermore, field #P+6 stores the number (NUM) of LBAs. Incidentally, a sense data list similar to the sense data list 173 is used.

Figure 21:
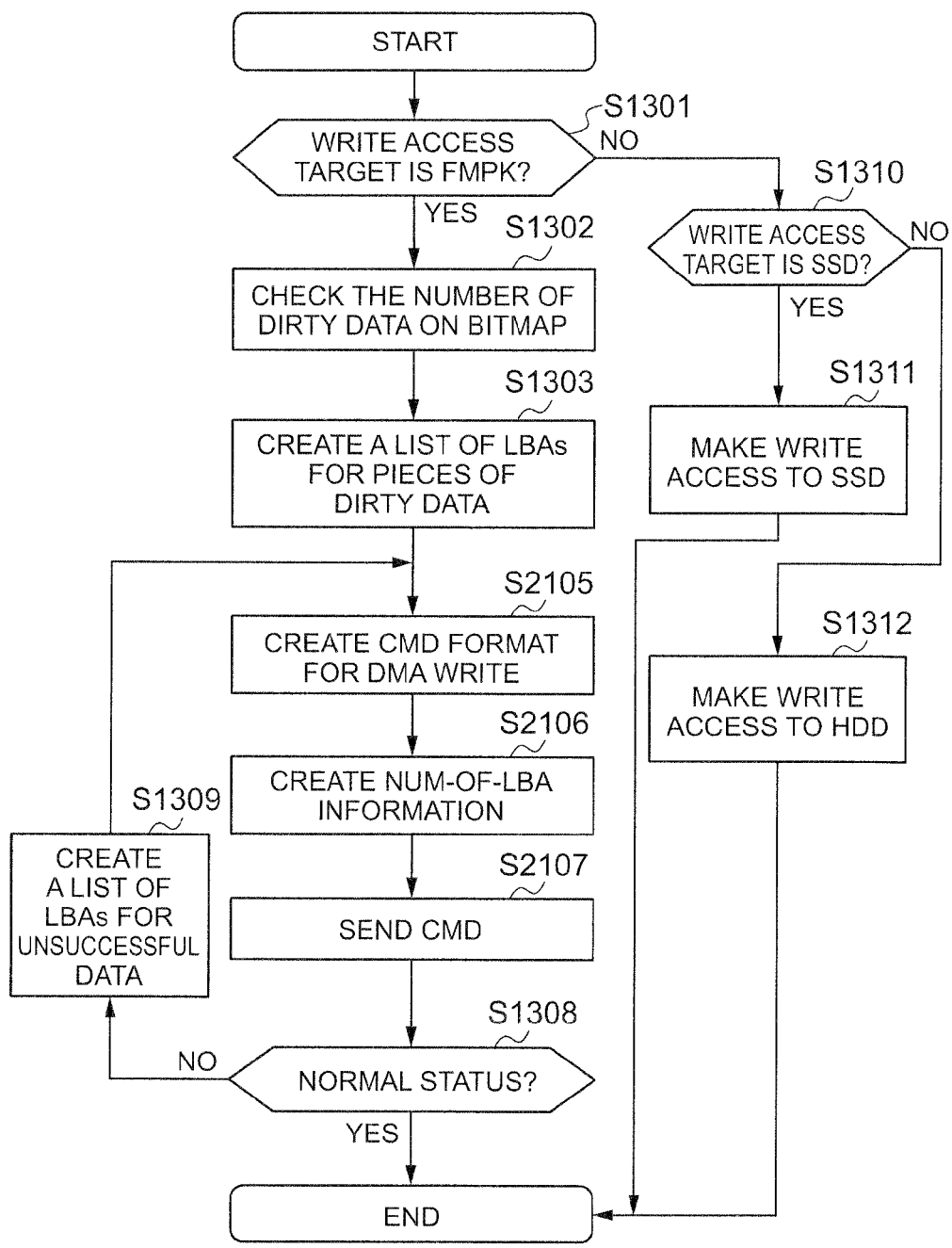
FIG. 21 is a flowchart for explaining write processing executed by the storage controller.

Next, write processing executed by the storage controller 110 will be explained in accordance with the flowchart in FIG. 21.

This processing is started by execution of the microcode programs 160 by the microprocessor 112 when executing the destaging processing. Incidentally, the same processing steps as those in FIG. 13 are performed in this processing, except that step S1302 in the processing shown in FIG. 13 is followed by step S1303, and then steps S2105 to S2107 are executed instead of steps S1305 to S1307, and the processing returns to step S2105 after step S1309.

The microprocessor 112 first judges, in response to a write request from the host computer 300, whether the write access target is an FMPK 130 or not (S1301); and if the write access target is the FMPK 130, the microprocessor 112 refers to the bitmap table 118 and checks the number of pieces of update data in the bitmap table 118, that is, the number of pieces of update data (dirty data) in the cache slot 117 (S1302).

Subsequently, the microprocessor 112 inputs a list of LBAs for the respective pieces of the update data to the command list 174 based on the check result and also inputs the addresses of the respective pieces of the update data in the cache memory and the addresses at which the respective pieces of the update data are to be stored (S1303).

Next, the microprocessor 112 inputs the format of the command to the command list 174 for the data control unit (DMA) 137 (S2105), creates information about the number of LBAs and inputs the number of LBAs at the end of the command list 174 (S2106), and sends, as transfer parameters, the command which is information input to the command list 174, including the addresses of the respective pieces of the update data in the cache memory and the addresses at which the respective pieces of the update data are to be stored, to the microprocessor 133 (S2107).

The microprocessor 112 then judges whether or not status information indicating a normal status has been returned from the microprocessor 133 (S1308); and if the status information indicating the normal status has been returned, the microprocessor 112 terminates the processing in this routine.

On the other hand, if a failure has occurred and status information indicating an abnormal status has been returned, the microprocessor 112 executes processing for generating a new list of LBAs relating to the update data, for which the write processing has failed, in order to execute the write processing again (S1309), and repeats the processing in steps S2105 to S1308 based on the newly generated list of LBAs.

Meanwhile, if the microprocessor 112 determines in step S1301 that the write access target is not the FMPK 130, the microprocessor 112 judges whether the write access target is an SSD 142 or not (S1310); and if it is determined, based on the device type 703 in the PDEV-SLOT mapping table 170 as identified by specifying the RG from the LU number 313 in the Port-WWN-LU-LDEV mapping table 161 and specifying the slot number from the RG number 401 in the RAID configuration table 164, that the write access target is the SSD 142, the microprocessor 112 executes processing for making write access to the SSD 142 which have been written in background art section (S1311).

If the microprocessor 112 determines in step S1310 that the write access target is not the SSD 142, it determines that the write access target is an HDD 140, and then executes processing for making write access to the HDD 140 which have been written in background art section (S1312).

Figure 22:
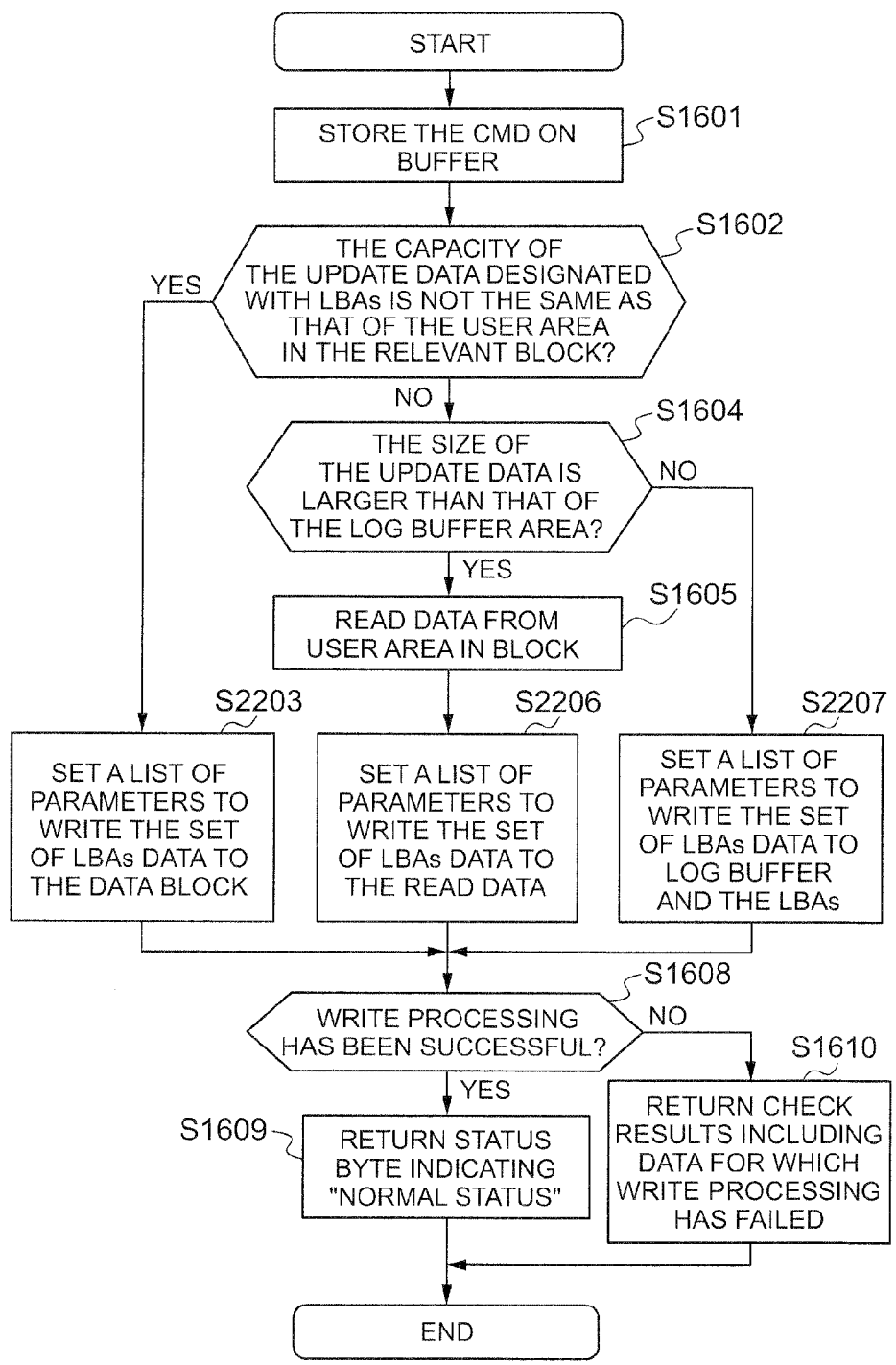
FIG. 22 is a flowchart for explaining write processing executed by the memory controller.

Next, write processing executed by the memory controller 131 will be explained in accordance with the flowchart in FIG. 22. This processing is started by execution of the microcode programs 160 by the microprocessor 112 when executing the destaging processing. Incidentally, the same processing steps as those in FIG. 16 are performed in this processing, except that steps S2203, S2206, S2207 are performed instead of steps S1603, S1606, S1607.

The microprocessor 133 first stores the command including the transfer parameters from the storage controller 110 in the buffer 152 (S1601).

Next, the data control unit (DMA) 137 which has received the command from the microprocessor 133 reads the pieces of the update data from the cache memory 113 in accordance with their addresses in the cache memory, and judges whether the capacity of the read update data is not the same as that of the user area 1351 in the block 1350 (S1602); and if it is determined that the capacity of the read update data is the same as that of the user area 1351 (Yes), the DMA 137 sets a list of parameters to write a set of LBAs data to the data blocks, and writes the read update data to the blocks designated by the transfer parameters (S2203) and then proceeds to step S1608. If it is determined that the capacity of the read update data is not the same as that of the user area 1351 (No), the DMA 137 judges whether the capacity of the read update data is larger than that of the log buffer area 1352 in the block 1350 (S1604).

If the size of the update data (data size) is larger than that of the log buffer area 1352, the data control unit (DMA) 137 reads data stored in the user area 1351 in the block 1350 where the update data is to be stored (S1605), sets a list of parameters to write a set of LBAs data to the read data, and overwrites the read data with the update data (S2206), stores the data overwritten with the update data in the user area 1351, and then proceeds to step S1608.

On the other hand, if it is determined in step S1604 that the size of the update data is smaller than the log buffer area 1352, the data control unit (DMA) 137 sets a list of parameters to write a set of LBAs data to the log buffer and the LBAs, and stores the update data in the log buffer area 1352 in the designated block 1350 (S1607) and then proceeds to step S1608.

The data control unit (DMA) 137 judges in step S1608 whether the processing for writing the data to the designated block 1350 has been successful or not; and if it is determined that the write processing has been successful, the microprocessor 133 writes $0$ as information indicating the success of the write processing to field #0 in the sense data list 173 (see FIG. 9B), returns status information (indicating a normal status) indicating the success of the write processing as a check result to the storage controller 110 (S1609), and then terminates the processing in this routine.

On the other hand, if it is determined that the write processing has failed, the data control unit (DMA) 137 writes data relating to the update data, regarding which the write processing has failed, as additional sense data to the sense data list 173 (see FIG. 9B), also writes $1$ as information (Valid) indicating the failure in the write processing, to field #0, returns these check results to the storage controller 110 (S1610), and then terminates the processing in this routine.

Figure 23:
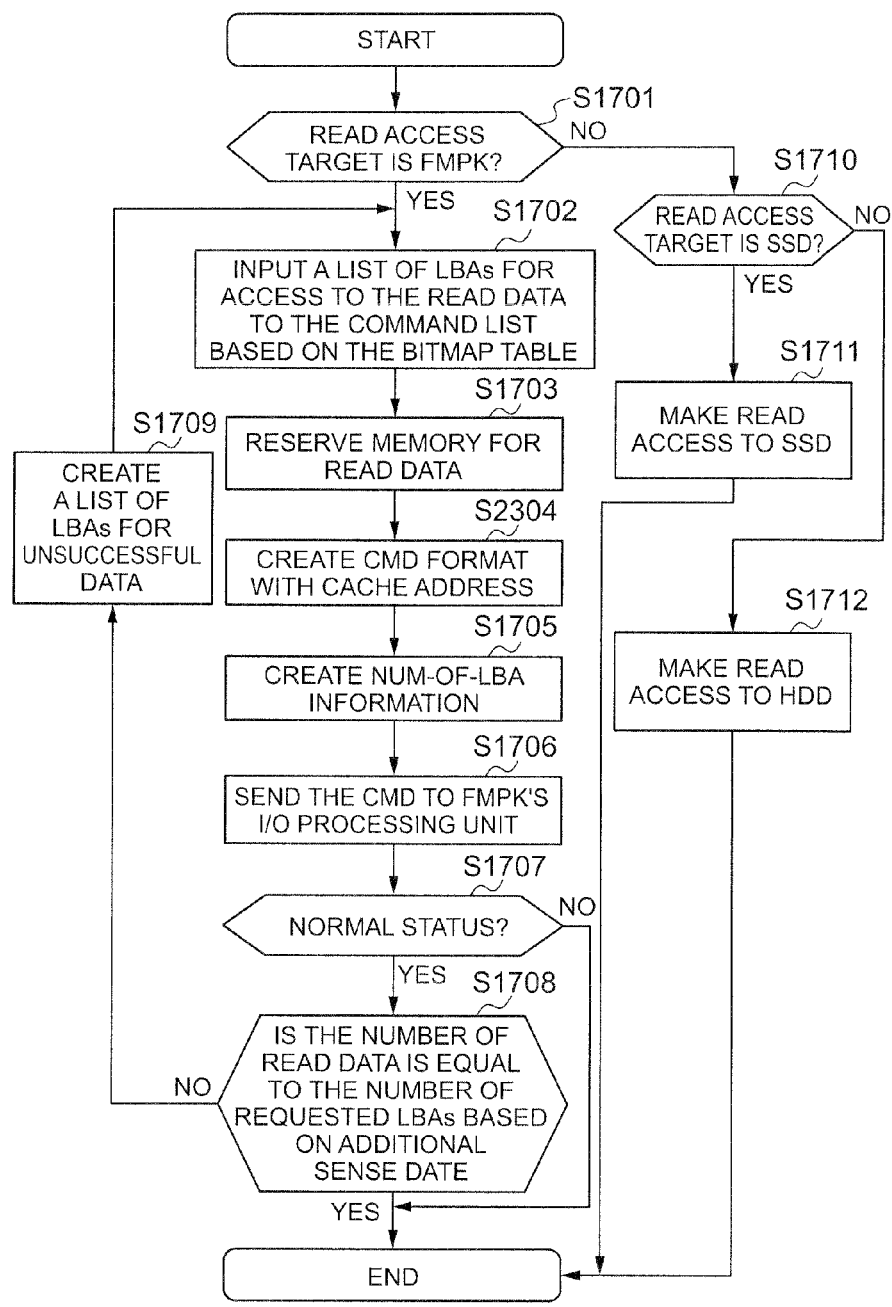
FIG. 23 is a flowchart for explaining read processing executed by the storage controller.

Next, read processing executed by the storage controller 110 will be explained in accordance with the flowchart in FIG. 23.

This processing is started by execution of the microcode programs 160 by the microprocessor 112. Incidentally, this processing is the same as the processing in FIG. 17, except that step S2304 is inserted between step S1703 and step S1704 in the processing in FIG. 17.

The microprocessor 112 first judges, in response to a read request to the host computer 300, whether the read access target is the FMPK 130 or not (S1701); and if it is determined, based on the device type 703 in the PDEV-SLOT mapping table 170 as identified by specifying the RG from the LU number 313 in the Port-WWN-LU-LDEV mapping table 161 and specifying the slot number from the RG number 401 in the RAID configuration table 164, that the read access target is the FMPK 130, the microprocessor 112 inputs a list of LBAs for accessing the read data to the command list 172 based on the bitmap table 118 (S1702), and reserves an area in the cache memory 113, to which the read data is to be read (S1703).

Subsequently, the microprocessor 112 inputs the format of a command CMD for making read access to the read data, to the command list 172 using cache addresses (S2304), inputs the number of LBAs to the command list 172 after the list of LBAs (S1705), and then transfers the command including information input to the command list 172 to the I/O processing unit 150 for the designated FMPK 130 (S1706).

Next, the microprocessor 112 judges whether or not status information indicating a success has been returned from the FMPK 130 which is the transfer destination (S1707); and if the status information indicating the success has been returned, the microprocessor 112 terminates the processing in this routine.

On the other hand, if the status information indicating a failure has been returned, the microprocessor 112 judges, based on the data written to the sense data in the sense data list 173, whether the number of pieces of read data is equal to the number of the requested LBAs or not (S1708); and if the number of pieces of read data is equal to the number of the requested LBAs, the microprocessor 112 terminates the processing in this routine. If the number of pieces of read data is not equal to the number of the requested LBAs, the microprocessor 112 generates a list of LBAs for the pieces of the unsuccessful read data as retry processing (S1709), and then repeats the processing in steps S1702 to S1708.

If it is determined in step S1701 that the read access target is not the FMPK 130, the microprocessor 112 judges whether the read access target is an SSD 142 or not (S1710); and if it is determined, based on the device type 703 in the PDEV-SLOT mapping table 170 as identified by specifying the RG from the LU number 313 in the Port-WWN-LU-LDEV mapping table 161 and specifying the slot number from the RG number 401 in the RAID configuration table 164, that the read access target is the SSD 142, the microprocessor 112 executes the processing for making read access to the SSD 142 (S1711), and then terminates the processing in this routine.

On the other hand, if it is determined that the read access target is not the SSD 142, the microprocessor 112 determine that the read access target is an HDD 140 and executes the processing for making read access to the HDD 140 (S1712), and then terminates the processing in this routine.

Figure 24:
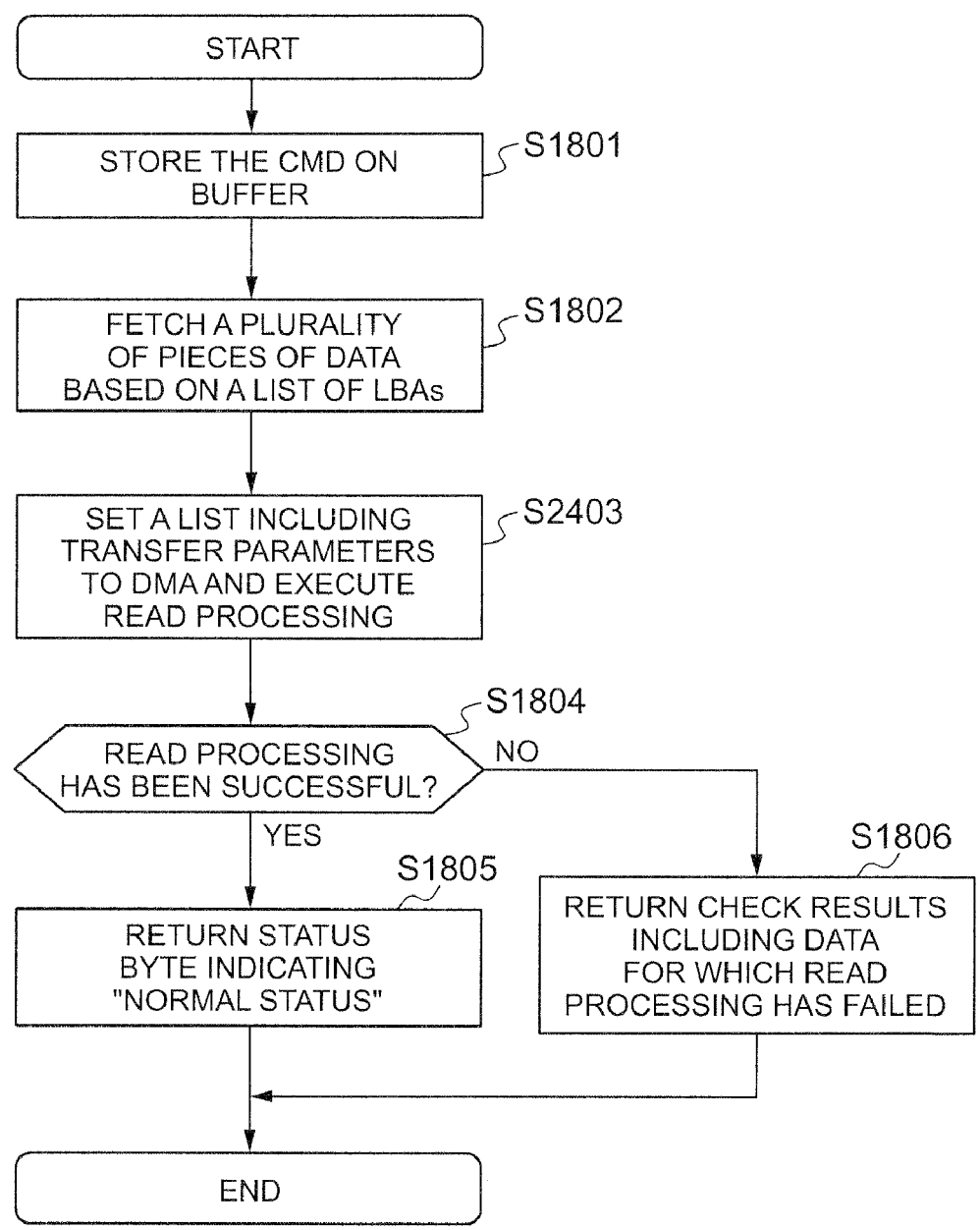
FIG. 24 is a flowchart for explaining read processing executed by the memory controller.

Next, read processing executed by the memory controller 131 will be explained in accordance with the flowchart in FIG. 24.

This processing is executed by the microprocessor 133 for the memory controller 131. In this case, step S2403 is added to between step S1802 and step S1804 in the processing shown in FIG. 18 and the processing steps other than step S2403 are the same as those in FIG. 18.

The microprocessor 133 for the memory controller 131 first stores the command, which has been sent from the storage controller 110, in the buffer 152 (S1801).

After receiving the command from the microprocessor 133, the data control unit (DMA) 137 fetches pieces of data, which are read access targets, based on the list of LBAs attached to the command stored in the buffer 152 (S1802), creates a list including transfer parameters for the data control unit 137, and executes the read processing based on the created list (S2403). As a result, processing for the read access is executed between the flash memory 135 and the data control unit 137. Incidentally, if the read access target data is log data relating to the user data, the DMA 137 may also read the log data, merge the log data and the user data together, and return the merged data to the storage controller 110 in steps S1802 and S2403.

Subsequently, the data control unit 137 judges whether the read processing for reading data from the flash memory 135 has been successful or not (S1804).

If the read processing has been successful, the data control unit 137 returns status information indicating the success of the read processing to the storage controller 110 (S1805), and then terminates the processing in this routine.

On the other hand, if it is determined that the read processing has failed, the data control unit 137 returns the list relating to the LBAs of the read data based on the additional sense data in the sense data list 173 as well as status information indicating the failure in the read processing to the storage controller 110 (S1806), and then terminates the processing in this routine.

According to this embodiment, the amount of data to be stored in the flash memory 135 can be reduced and overhead pertaining to the processing for storing the data in the flash memory 135 can be reduced.

REFERENCE SIGNS LIST 100 storage subsystem
110 storage controller
112 microprocessor
113 memory
120 internal bus network
130 FMPK
133 microprocessor
135 flash memory
136 memory
140 HDD
142 SSD
200 network
300 host computer

The invention claimed is:

1. A storage subsystem comprising:
a plurality of storage apparatuses for storing data;
a storage controller for storing, in a cache memory, data updated in response to an access request from a host computer and generating a command for controlling data input to and output from an access target designated by the access request; and
a memory controller for specifying a storage apparatus to be the access target from among the plurality of storage apparatuses based on the command generated by the storage controller and sending/receiving data to/from the specified storage apparatus,
wherein the plurality of storage apparatuses includes a plurality of nonvolatile semiconductor memories having a block group that is a storage unit for the data,
wherein when executing destaging processing for writing a plurality of pieces of update data existing in the cache memory to any blocks in the plurality of nonvolatile semiconductor memories, the storage controller generates a specific command as a command for executing the destaging processing, adds each of the pieces of the update data and a plurality of parameters, each indicating where each of the pieces of the update data is to be stored, to the specific command generated, and transfers the specific command, to which each of the parameters and each of the pieces of the update data are added, to the memory controller,
wherein the memory controller stores each of the pieces of the update data in a block of the nonvolatile semiconductor memory designated by each of the parameters based on the specific command,
wherein each block in each of the plurality of the nonvolatile semiconductor memories includes a user area and a log buffer area having smaller storage capacity than that of the user area,
wherein when the memory controller stores each of the pieces of the update data in each of the designated blocks, if the capacity of each of the pieces of the update data is equal to or less than the storage capacity of the log buffer area in each of the designated blocks, the memory controller stores each of the pieces of the update data in the log buffer area in each of the designated blocks, and
wherein if the capacity of each of the pieces of the update data is larger than the storage capacity of the log buffer area in each of the designated blocks, the memory controller reads data from the user area in each of the designated blocks, overwrites each piece of the data read from the user area with each of the pieces of the update data, and stores the data overwritten with each of the pieces of the update data in the user area in each of the designated blocks.

2. The storage subsystem according to claim 1, wherein the plurality of storage apparatuses includes a plurality of hard disk drives or a plurality of semiconductor drives as storage devices which are not targets of the destaging processing, and
wherein the storage controller determines whether or not the plurality of nonvolatile semiconductor memories are access targets of an access request from the host computer,
wherein if the plurality of nonvolatile semiconductor memories are access targets of a write access made in response to the access request, the storage controller generates the specific command, and
wherein if the storage devices which are not targets of the destaging processing are targets of the write access made in response to the access request, the storage controller generates a command for making write access to the plurality of hard disk drives or the plurality of semiconductor drives.

3. The storage subsystem according to claim 1, wherein in the processing of storing each of the pieces of the update data in each of the designated blocks, the memory controller determines whether a failure has occurred or not, and then sends each determination result to the storage controller, and
wherein when receiving the determination result indicating the occurrence of the failure from the memory controller, the storage controller generates a new specific command as the specific command for resending update data, which failed to be stored in the designated block due to the occurrence of the failure, from among each of the pieces of the update data to the memory controller and transfers the newly generated specific command to the memory controller.

4. The storage subsystem according to claim 1, wherein the memory controller includes a data control unit for accessing the cache memory and the plurality of nonvolatile semiconductor memories,
wherein if information is to be transferred to the data control unit when executing the destaging processing, the storage controller transfers a transfer parameter including an address for each of the pieces of the update data in the cache memory and an address indicating where each of the pieces of the update data is to be stored, to the data control unit, and
wherein the data control unit reads each of the pieces of the update data from the cache memory based on the transfer parameter and then stores each piece of the read update data in a designated block in the nonvolatile semiconductor memory.

5. A data processing method for a storage subsystem including:
a plurality of storage apparatuses for storing data;
a storage controller for storing, in a cache memory, data updated in response to an access request from a host computer and generating a command for controlling data input to and output from an access target designated by the access request; and a memory controller for specifying a storage apparatus to be the access target from among the plurality of storage apparatuses based on the command generated by the storage controller and sending/receiving data to/from the specified storage apparatus;

wherein the plurality of storage apparatuses includes a plurality of nonvolatile semiconductor memories having a block group that is a storage unit for the data;

wherein when executing destaging processing for writing a plurality of pieces of update data existing in the cache memory to any blocks in the plurality of nonvolatile semiconductor memories, the storage controller executes the following steps of:

generating a specific command as a command for executing the destaging processing;

adding each of the pieces of the update data and a plurality of parameters, each indicating where each of the pieces of the update data is to be stored, to the specific command generated in the above command generation step; and transferring the specific command, to which each of the parameters and each of the pieces of the update data are added in the above addition step, to the memory controller, wherein the memory controller executes a step of storing each of the pieces of the update data in a block of the nonvolatile semiconductor memory designated by each of the parameters based on the specific command, wherein each block in each of the plurality of the nonvolatile semiconductor memories includes a user area and a log buffer area having smaller storage capacity than that of the user area, wherein when storing each of the pieces of the update data in each of the designated blocks, the memory controller executes the following steps of:

storing each of the pieces of the update data in the log buffer area in each of the designated blocks if the capacity of each of the pieces of the update data is equal to or less than the storage capacity of the log buffer area in each of the designated blocks;

if the capacity of each of the pieces of the update data is larger than the storage capacity of the log buffer area in each of the designated blocks, reading data from the user area in each of the designated blocks;

overwriting each piece of the data read from the user area with each of the pieces of the update data; and storing the data overwritten with each of the pieces of the update data in the user area in each of the designated blocks.

6. The storage subsystem data processing method according to claim 5, wherein the plurality of storage apparatuses includes a plurality of hard disk drives or a plurality of semiconductor drives as storage devices which are not targets of the destaging processing, and wherein the storage controller executes the following steps of:

determining whether or not the plurality of nonvolatile semiconductor memories are access targets of an access request from the host computer;

generating the specific command if the plurality of nonvolatile semiconductor memories are access targets of a write access made in response to the access request; and generating a command for making write access to the plurality of hard disk drives or the plurality of semiconductor drives if the storage devices which are not targets of the destaging processing are targets of the write access made in response to the access request.

7. The storage subsystem data processing method according to claim 5, wherein in the processing of storing each of the pieces of the update data in each of the designated blocks, the memory controller executes the following steps of:

determining whether a failure has occurred or not; and sending each determination result to the storage controller, and wherein when receiving the determination result indicating the occurrence of the failure from the memory controller, the storage controller executes the following steps of:

generating a new specific command as the specific command for resending update data, which failed to be stored in the designated block due to the occurrence of the failure, from among each of the pieces of the update data to the memory controller; and transferring the newly generated specific command to the memory controller.

8. The storage subsystem data processing method according to claim 5, wherein the memory controller includes a data control unit for accessing the cache memory and the plurality of nonvolatile semiconductor memories, wherein if information is to be transferred to the data control unit when executing the destaging processing, the storage controller executes a step of transferring a transfer parameter including an address for each of the pieces of the update data in the cache memory and an address indicating where each of the pieces of the update data is to be stored, to the data control unit, and the data control unit executes the following steps of:

reading each of the pieces of the update data from the cache memory based on the transfer parameter; and storing each piece of the read update data in a designated block in the nonvolatile semiconductor memory.

\* \* \* \* \*